(12) United States Patent
Fattal

(10) Patent No.: US 11,906,761 B2
(45) Date of Patent: Feb. 20, 2024

(54) MULTICOLOR STATIC MULTIVIEW DISPLAY AND METHOD

(71) Applicant: LEIA INC., Menlo Park, CA (US)

(72) Inventor: David A. Fattal, Mountain View, CA (US)

(73) Assignee: LEIA INC., Menlo Park, CA (US)

( * ) Notice: Subject to any disclaimer, the term of this patent is extended or adjusted under 35 U.S.C. 154(b) by 0 days.

(21) Appl. No.: 18/129,877

(22) Filed: Apr. 2, 2023

(65) Prior Publication Data

US 2023/0244011 A1    Aug. 3, 2023

Related U.S. Application Data

(60) Division of application No. 16/820,567, filed on Mar. 16, 2020, now Pat. No. 11,650,359, which is a
(Continued)

(51) Int. Cl.
*G02B 5/18* (2006.01)
*G02B 30/56* (2020.01)
(Continued)

(52) U.S. Cl.
CPC .............. *G02B 5/18* (2013.01); *G02B 6/0028* (2013.01); *G02B 6/0068* (2013.01); *G02B 27/30* (2013.01); *G02B 27/4205* (2013.01); *G02B 30/56* (2020.01)

(58) Field of Classification Search
USPC .......................................................... 348/42
See application file for complete search history.

(56) References Cited

U.S. PATENT DOCUMENTS

| 5,239,452 A | 8/1993 | Chen |
| 6,196,691 B1 | 3/2001 | Ochiai |

(Continued)

FOREIGN PATENT DOCUMENTS

| JP | S62-203122 A | 9/1987 |
| JP | H05-232519 A | 9/1993 |

(Continued)

OTHER PUBLICATIONS

International Search Report and Written Opinion (ISRWO) by International Searching Authority (ISA) Korean Intellectual Property Office (KIPO), dated Jun. 25, 2018 (13 pages) for counterpart foreign parent PCT Application No. PCT/US2017/053824.

(Continued)

*Primary Examiner* — Nigar Chowdhury
(74) *Attorney, Agent, or Firm* — J. Michael Johnson

(57) ABSTRACT

A multicolor static multiview display and method of multicolor static multiview display operation provide a color static multiview image using diffractive gratings to diffractively scatter light from guided light beams having a selectable color and different radial directions. The multicolor static multiview display includes a light guide configured to guide plurality of guided light beams and a multicolor light source configured to provide the guided light beam plurality having the selectable color and the different radial directions. The multicolor static multiview display further includes a plurality of diffraction gratings configured to provide from a portion of the guided light beams directional light beams having a color, intensities, and principal angular directions corresponding to color view pixels of the color static multiview image.

8 Claims, 8 Drawing Sheets

Related U.S. Application Data continuation of application No. PCT/US2017/053824, filed on Sep. 27, 2017.

(51) Int. Cl.
*F21V 8/00* (2006.01)
*G02B 27/30* (2006.01)
*G02B 27/42* (2006.01)

(56) References Cited

U.S. PATENT DOCUMENTS

| | | | |
|---|---|---|---|
| 6,580,529 B1 | 6/2003 | Amitai et al. | |
| 9,128,226 B2 | 9/2015 | Fattal et al. | |
| 9,201,270 B2 | 12/2015 | Fattal et al. | |
| 9,298,168 B2 | 3/2016 | Taff et al. | |
| 9,389,415 B2 | 7/2016 | Fattal et al. | |
| 9,459,461 B2 | 10/2016 | Santori et al. | |
| 9,557,466 B2 | 1/2017 | Fattal | |
| 9,785,119 B2 | 10/2017 | Taff et al. | |
| 10,345,505 B2 | 7/2019 | Fattal | |
| 2005/0041174 A1 | 2/2005 | Numata et al. | |
| 2005/0140832 A1 | 6/2005 | Goldman et al. | |
| 2006/0191177 A1 | 8/2006 | Engel | |
| 2007/0129864 A1 | 6/2007 | Tanaka et al. | |
| 2007/0298533 A1 | 12/2007 | Yang et al. | |
| 2008/0204663 A1 | 8/2008 | Balogh | |
| 2008/0225393 A1 | 9/2008 | Rinko | |
| 2009/0244706 A1 | 10/2009 | Levola et al. | |
| 2009/0279284 A1 | 11/2009 | Takeuchi et al. | |
| 2010/0039832 A1 | 2/2010 | Ahlgren et al. | |
| 2010/0302803 A1 | 12/2010 | Bita et al. | |
| 2011/0002143 A1 | 1/2011 | Saarikko et al. | |
| 2011/0141395 A1 | 6/2011 | Yashiro | |
| 2012/0113678 A1 | 5/2012 | Cornelissen et al. | |
| 2013/0265802 A1 | 10/2013 | Kamikatano et al. | |
| 2015/0205034 A1 | 7/2015 | Faecke et al. | |
| 2015/0301338 A1* | 10/2015 | Van Heugten | G09G 3/32 345/8 |
| 2016/0033705 A1* | 2/2016 | Fattal | G02B 6/0031 359/462 |
| 2016/0033784 A1 | 2/2016 | Levola et al. | |
| 2016/0132025 A1 | 5/2016 | Taff et al. | |
| 2016/0212417 A1 | 7/2016 | Ng et al. | |
| 2016/0327906 A1* | 11/2016 | Futterer | G03H 1/2294 |
| 2017/0085867 A1 | 3/2017 | Baran et al. | |
| 2017/0090096 A1 | 3/2017 | Fattal | |
| 2017/0192244 A1 | 7/2017 | Shinohara et al. | |
| 2017/0299793 A1 | 10/2017 | Fattal | |
| 2017/0299794 A1 | 10/2017 | Fattal | |
| 2017/0363794 A1 | 12/2017 | Wan et al. | |
| 2018/0004156 A1 | 1/2018 | Schilling et al. | |
| 2018/0024289 A1 | 1/2018 | Fattal | |
| 2018/0188691 A1 | 7/2018 | Fattal | |
| 2018/0321500 A1 | 11/2018 | Chen et al. | |
| 2019/0317265 A1 | 10/2019 | Fattal et al. | |
| 2020/0033619 A1 | 1/2020 | Fattal et al. | |
| 2020/0229762 A1 | 7/2020 | Gad et al. | |

FOREIGN PATENT DOCUMENTS

| | | |
|---|---|---|
| JP | H06-082612 A | 3/1994 |
| JP | H06-332354 A | 12/1994 |
| JP | H07-162026 A | 6/1995 |
| JP | H11-133255 A | 5/1999 |
| JP | 2000267041 A | 9/2000 |
| JP | 2001175197 A | 6/2001 |
| JP | 2004302186 A | 10/2004 |
| JP | 2004319252 A | 11/2004 |
| JP | 2002031788 A | 2/2012 |
| JP | 2012022085 A | 2/2012 |
| KR | 100643583 B1 | 11/2006 |
| KR | 20130017886 A1 | 2/2013 |
| WO | 2014051623 A1 | 4/2014 |
| WO | 2017041079 A1 | 3/2017 |
| WO | 2019168538 A1 | 9/2019 |

OTHER PUBLICATIONS

Fattal, David et al., "A multi-directional backlight for a wide-angle, glasses-free three-dimensional display," Nature, Mar. 21, 2013, pp. 348-351, vol. 495, Macmillan Publishers Limited, 2013.

Reichelt et al., "Holographic 3-D Displays—Electro-holography within the Grasp of Commercialization," Advances in Lasers and Electro-Optics, Optics, Nelson Costa and Adolfo Cartaxo (Ed.), (2010), pp. 683-711, ISBN: 978-953-307-088-9, InTech, Available from: http://www.intechopen.com/books/advances-in-lasers-and-electro-optics/holographic-3-ddisplays-electro-holography-within-the-grasp-of-commercialization.

Travis et al., "Collimated light from a waveguide for a display backlight," Optics Express, Oct. 2009, pp. 19714-19719, vol. 17, No. 22.

Xu et al., "Computer-Generated Holography for Dynamic Display of 3D Objects with Full Parallax," International Journal of Virtual Reality, 2009, pp. 33-38, vol. 8, No. 2.

Son, Jung-Young et al., "Three-Dimensional Imaging Methods Based on Multiview Images," IEEE/OSA Journal of Display Technology, Sep. 2005, pp. 125-140, vol. 1, No. 1.

Kee, Edwin., "Hitachi Full Parallax 3D Display Offers Mind Bending Visuals," http://www.ubergizmo.com/2011/10/hitachi-full-parallax-3d-display-offers-mind-bending-visuals, Oct. 4, 2011, 2 pages.

Maimone, A., et al., Pinlight Displays: Wide Field of View Augmented Reality Eyeglasses using Defocused Point Light Sources, ACM Transactions on Graphics, Jul. 2014, pp. 89.1-89.11, vol. 33, No. 4, Article 89.

Chun-Wei Liu, et al., Sub-wavelength gratings fabricated on a light bar by roll-to-roll UV embossing process, Optics Express, Jun. 6, 2011, pp. 11299-11311, vol. 19, No. 12.

* cited by examiner

MULTICOLOR STATIC MULTIVIEW DISPLAY AND METHOD

CROSS-REFERENCE TO RELATED APPLICATIONS

This application is a divisional application of and claims priority to U.S. patent application Ser. No. 16/820,567, filed Mar. 16, 2020, which is a continuation application of and claims priority to International Patent Application No. PCT/US2017/053824, filed Sep. 27, 2017, each of which is incorporated by reference in its entirety herein

STATEMENT REGARDING FEDERALLY SPONSORED RESEARCH OR DEVELOPMENT

N/A

BACKGROUND

Displays and more particularly 'electronic' displays are a nearly ubiquitous medium for communicating information to users of a wide variety of devices and products. For example, electronic displays may be found in various devices and applications including, but not limited to, mobile telephones (e.g., smart phones), watches, tablet computes, mobile computers (e.g., laptop computers), personal computers and computer monitors, automobile display consoles, camera displays, and various other mobile as well as substantially non-mobile display applications and devices. Electronic displays generally employ a differential pattern of pixel intensity to represent or display an image or similar information that is being communicated. The differential pixel intensity pattern may be provided by reflecting light incident on the display as in the case of passive electronic displays. Alternatively, the electronic display may provide or emit light to provide the differential pixel intensity pattern. Electronic displays that emit light are often referred to as active displays.

BRIEF DESCRIPTION OF THE DRAWINGS

Various features of examples and embodiments in accordance with the principles described herein may be more readily understood with reference to the following detailed description taken in conjunction with the accompanying drawings, where like reference numerals designate like structural elements, and in which.

Figure 1A:
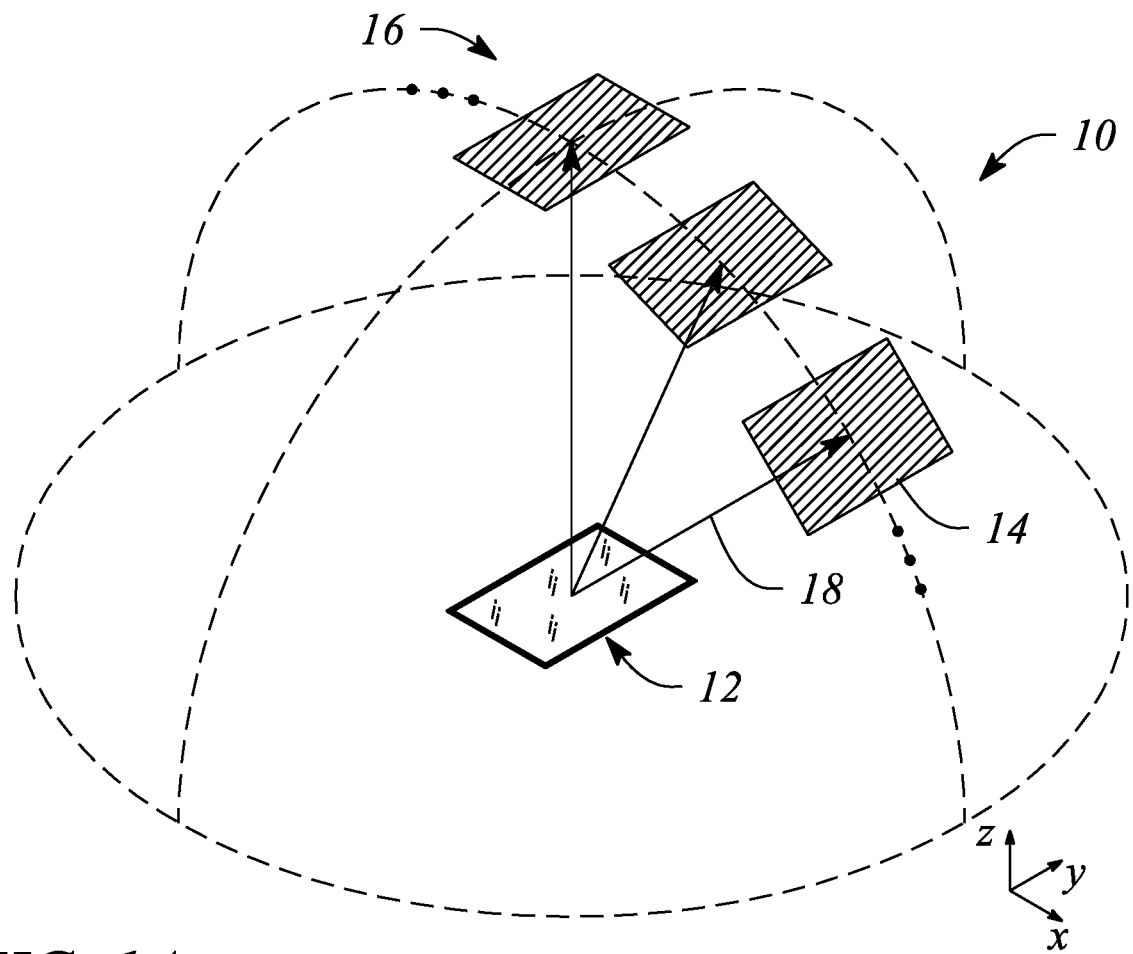
FIG. 1A illustrates a perspective view of a multiview display in an example, according to an embodiment consistent with the principles described herein.

Certain examples and embodiments have other features that are one of in addition to and in lieu of the features illustrated in the above-referenced figures. These and other features are detailed below with reference to the above-referenced figures.

DETAILED DESCRIPTION

Examples and embodiments in accordance with the principles described herein provide display of a static or quasi-static three-dimensional (3D) or multiview image having a selectable color (i.e., a 'color' multiview image). In particular, embodiments consistent with the principles described display the static or quasi-static color multiview image using a plurality of directional light beams. A color as well as individual intensities and directions of directional light beams of the directional light beam plurality, in turn, correspond to various color view pixels in views of the multicolor multiview image being displayed. According to various embodiments, the individual intensities and, in some embodiments, the individual directions of the directional light beams are predetermined or 'fixed.' As such, the displayed color multiview image may be referred to as a static or quasi-static color multiview image. Further, the color of the color multiview image may be selectable as a function of time, according some embodiments As described herein, a multicolor static multiview display configured to display the static or quasi-static color multiview image comprises diffraction gratings optically connected to a light guide to provide the directional light beams having the individual directional light beam intensities and directions. The diffraction gratings are configured to emit or provide the directional light beams by or according to diffractive coupling or scattering out of light guided from within the light guide, the light being guided as a plurality of guided light beams. Further, guided light beams of the guided light beam plurality are guided within the light guide at different radial directions from one another. As such, a diffraction grating of the diffraction grating plurality comprises a grating characteristic that accounts for or that is a function of a particular radial direction of a guided light beam incident on the diffraction grating. In particular, the grating characteristic may be a function of a relative location of the diffraction grating and a light source configured to provide the guided light beam. According to various embodiments, the grating characteristic is configured to account for the radial direction of the guided light beam to insure a correspondence between the emitted directional light beams provide by the diffraction gratings and associated view pixels in various views of the static or quasi-static color multiview image being displayed.

Herein, a 'multiview display' is defined as an electronic display or display system configured to provide different views of a multiview image in different view directions. A 'static multiview display' is a defined as a multiview display configured to display a predetermined or fixed (i.e., static) multiview image, albeit as a plurality of different views. A 'quasi-static multiview display' is defined herein as a static multiview display that may be switched between different fixed multiview images or between a plurality of multiview image states, typically as a function of time. Switching between the different fixed multiview images or multiview image states may provide a rudimentary form of animation, for example. Further, as defined herein, a quasi-static multiview display is a type of static multiview display. As such, no distinction is made between a purely static multiview display or image and a quasi-static multiview display or image, unless such distinction is necessary for proper understanding.

Further, herein a 'color' multiview image is defined as a multiview image having a particular or predefined color. In some embodiments, the predefined color may be selectable. That is, the predefined color may be chosen during operation and further may be changeable as a function of time. For example, during a first time interval the color of the color multiview image may be selected to be or comprise a first color, while the color of the color multiview image may be selected to be or comprise a second color at or during a second time interval. Color selection may be provided by a color-selectable or color-controllable multicolor light source (i.e., a color light source in which a color of provided light is controllable), for example.

FIG. 1A illustrates a perspective view of a multiview display 10 in an example, according to an embodiment consistent with the principles described herein. As illustrated in FIG. 1A, the multiview display 10 comprises a diffraction grating on a screen 12 configured to display a view pixel in a view 14 within or of a multiview image 16 (or equivalently a view 14 of the multiview display 10). The multiview image 16 may have a selectable color and therefore may be a color multiview image, for example. The screen 12 may be a display screen of an automobile, a telephone (e.g., mobile telephone, smart phone, etc.), a tablet computer, a laptop computer, a computer monitor of a desktop computer, a camera display, or an electronic display of substantially any other device, for example.

The multiview display 10 provides different views 14 of the multiview image 16 in different view directions 18 (i.e., in different principal angular directions) relative to the screen 12. The view directions 18 are illustrated as arrows extending from the screen 12 in various different principal angular directions. The different views 14 are illustrated as shaded polygonal boxes at the termination of the arrows (i.e., depicting the view directions 18). Thus, when the multiview display 10 (e.g., as illustrated in FIG. 1A) is rotated about the y-axis, a viewer sees different views 14. On the other hand (as illustrated) when the multiview display 10 in FIG. 1A is rotated about the x-axis the viewed image is unchanged until no light reaches the viewer's eyes (as illustrated).

Note that, while the different views 14 are illustrated as being above the screen 12, the views 14 actually appear on or in a vicinity of the screen 12 when the multiview image 16 is displayed on the multiview display 10 and viewed by the viewer. Depicting the views 14 of the multiview image 16 above the screen 12 as in FIG. 1A is done only for simplicity of illustration and is meant to represent viewing the multiview display 10 from a respective one of the view directions 18 corresponding to a particular view 14. Further, in FIG. 1A only three views 14 and three view directions 18 are illustrated, all by way of example and not limitation.

A view direction or equivalently a light beam having a direction corresponding to a view direction of a multiview display generally has a principal angular direction given by angular components $\{\theta, \phi\}$, by definition herein. The angular component $\theta$ is referred to herein as the 'elevation component' or 'elevation angle' of the light beam. The angular component $\phi$ is referred to as the 'azimuth component' or 'azimuth angle' of the light beam. By definition, the elevation angle $\theta$ is an angle in a vertical plane (e.g., perpendicular to a plane of the multiview display screen while the azimuth angle $\phi$ is an angle in a horizontal plane (e.g., parallel to the multiview display screen plane).

Figure 1B:
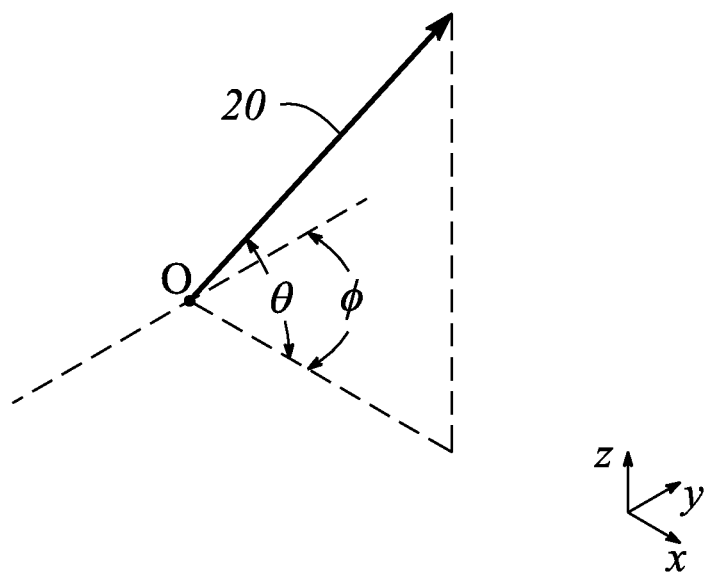
FIG. 1B illustrates a graphical representation of angular components of a light beam having a particular principal angular direction corresponding to a view direction of a multiview display in an example, according to an embodiment consistent with the principles described herein.

FIG. 1B illustrates a graphical representation of the angular components $\{\theta, \phi\}$ of a light beam 20 having a particular principal angular direction corresponding to a view direction (e.g., view direction 18 in FIG. 1A) of a multiview display in an example, according to an embodiment consistent with the principles described herein. In addition, the light beam 20 is emitted or emanates from a particular point, by definition herein. That is, by definition, the light beam 20 has a central ray associated with a particular point of origin within the multiview display. FIG. 1B also illustrates the light beam (or view direction) point of origin O.

Further herein, the term 'multiview' as used in the terms 'multiview image' and 'multiview display' is defined as a plurality of views representing different perspectives or including angular disparity between views of the view plurality. In addition, herein the term 'multiview' explicitly includes more than two different views (i.e., a minimum of three views and generally more than three views), by definition herein. As such, 'multiview display' as employed herein is explicitly distinguished from a stereoscopic display that includes only two different views to represent a scene or an image. Note however, while multiview images and multiview displays may include more than two views, by definition herein, multiview images may be viewed (e.g., on a multiview display) as a stereoscopic pair of images by selecting only two of the multiview views to view at a time (e.g., one view per eye).

In the multiview display, a 'multiview pixel' is defined herein as a set or plurality of view pixels representing pixels in each of a similar plurality of different views of a multiview display. Equivalently, a multiview pixel may have an individual view pixel corresponding to or representing a pixel in each of the different views of the multiview image to be displayed by the multiview display. Moreover, the view pixels of the multiview pixel are so-called 'directional pixels' in that each of the view pixels is associated with a predetermined view direction of a corresponding one of the different views, by definition herein. Further, according to various examples and embodiments, the different view pixels represented by the view pixels of a multiview pixel may have equivalent or at least substantially similar locations or coordinates in each of the different views. For example, a first multiview pixel may have individual view pixels corresponding to view pixels located at $\{x_1, y_1\}$ in each of the different views of a multiview image, while a second multiview pixel may have individual view pixels corresponding to view pixels located at $\{x_2, y_2\}$ in each of the different views, and so on. A view pixel having or comprising a particular or predefined (e.g., a selectable) color is a 'color' view pixel, by definition herein.

In some embodiments, a number of view pixels (or color view pixels) in a multiview pixel may be equal to a number of views of the multiview display. For example, the multiview pixel may provide eight (8) view pixels associated with a multiview display having 8 different views. Alternatively, the multiview pixel may provide sixty-four (64) view pixels associated with a multiview display having 64 different views. In another example, the multiview display may provide an eight by four array of views (i.e., thirty-two views) and the multiview pixel may include thirty-two (32) view pixels (i.e., one for each view). Further, according to some embodiments, a number of multiview pixels of the multiview display may be substantially equal to a number of pixels that make up a selected view of the multiview display.

Herein, a 'light guide' is defined as a structure that guides light within the structure using total internal reflection. In particular, the light guide may include a core that is substantially transparent at an operational wavelength of the light guide. In various examples, the term 'light guide' generally refers to a dielectric optical waveguide that employs total internal reflection to guide light at an interface between a dielectric material of the light guide and a material or medium that surrounds that light guide. By definition, a condition for total internal reflection is that a refractive index of the light guide is greater than a refractive index of a surrounding medium adjacent to a surface of the light guide material. In some embodiments, the light guide may include a coating in addition to or instead of the aforementioned refractive index difference to further facilitate the total internal reflection. The coating may be a reflective coating, for example. The light guide may be any of several light guides including, but not limited to, one or both of a plate or slab guide and a strip guide.

Further herein, the term 'plate' when applied to a light guide as in a 'plate light guide' is defined as a piece-wise or differentially planar layer or sheet, which is sometimes referred to as a 'slab' guide. In particular, a plate light guide is defined as a light guide configured to guide light in two substantially orthogonal directions bounded by a top surface and a bottom surface (i.e., opposite surfaces) of the light guide. Further, by definition herein, the top and bottom surfaces are both separated from one another and may be substantially parallel to one another in at least a differential sense. That is, within any differentially small section of the plate light guide, the top and bottom surfaces are substantially parallel or co-planar.

In some embodiments, the plate light guide may be substantially flat (i.e., confined to a plane) and therefore, the plate light guide is a planar light guide. In other embodiments, the plate light guide may be curved in one or two orthogonal dimensions. For example, the plate light guide may be curved in a single dimension to form a cylindrical shaped plate light guide. However, any curvature has a radius of curvature sufficiently large to ensure that total internal reflection is maintained within the plate light guide to guide light.

Herein, a 'diffraction grating' is generally defined as a plurality of features (i.e., diffractive features) arranged to provide diffraction of light incident on the diffraction grating. In some examples, the plurality of features may be arranged in a periodic or quasi-periodic manner having one or more grating spacings between pairs of the features. For example, the diffraction grating may comprise a plurality of features (e.g., a plurality of grooves or ridges in a material surface) arranged in a one-dimensional (1D) array. In other examples, the diffraction grating may be a two-dimensional (2D) array of features. The diffraction grating may be a 2D array of bumps on or holes in a material surface, for example. According to various embodiments and examples, the diffraction grating may be a sub-wavelength grating having a grating spacing or distance between adjacent diffractive features that is less than about a wavelength of light that is to be diffracted by the diffraction grating.

As such, and by definition herein, the 'diffraction grating' is a structure that provides diffraction of light incident on the diffraction grating. If the light is incident on the diffraction grating from a light guide, the provided diffraction or diffractive scattering may result in, and thus be referred to as, 'diffractive coupling' in that the diffraction grating may couple light out of the light guide by diffraction. The diffraction grating also redirects or changes an angle of the light by diffraction (i.e., at a diffractive angle). In particular, as a result of diffraction, light leaving the diffraction grating generally has a different propagation direction than a propagation direction of the light incident on the diffraction grating (i.e., incident light). The change in the propagation direction of the light by diffraction is referred to as 'diffractive redirection' herein. Hence, the diffraction grating may be understood to be a structure comprising diffractive features that diffractively redirects light incident on the diffraction grating and, if the light is incident from a light guide, the diffraction grating may also diffractively couple out the light from the light guide.

Further, by definition herein, the features of a diffraction grating are referred to as 'diffractive features' and may be one or more of at, in and on a material surface (i.e., a boundary between two materials). The surface may be a surface of a light guide, for example. The diffractive features may include any of a variety of structures that diffract light including, but not limited to, one or more of grooves, ridges, holes and bumps at, in or on the surface. For example, the diffraction grating may include a plurality of substantially parallel grooves in the material surface. In another example, the diffraction grating may include a plurality of parallel ridges rising out of the material surface. The diffractive features (e.g., grooves, ridges, holes, bumps, etc.) may have any of a variety of cross-sectional shapes or profiles that provide diffraction including, but not limited to, one or more of a sinusoidal profile, a rectangular profile (e.g., a binary diffraction grating), a triangular profile and a saw tooth profile (e.g., a blazed grating).

As described further below, a diffraction grating herein may have a grating characteristic, including one or more of a feature spacing or pitch, an orientation and a size (such as a width or length of the diffraction grating). Further, the grating characteristic may selected or chosen to be a function of the angle of incidence of light beams on the diffraction grating, a distance of the diffraction grating from a light source (e.g., a multicolor light source) or both. In particular, the grating characteristic of a diffraction grating may be chosen to depend on a relative location of the light source and a location of the diffraction grating, according to some embodiments. By appropriately varying the grating characteristic of the diffraction grating, both an intensity and a principal angular direction of a light beam diffracted (e.g., diffractively coupled-out of a light guide) by the diffraction grating (i.e., a 'directional light beam') corresponds to an intensity and a view direction of a view pixel of the multiview image.

According to various examples described herein, a diffraction grating (e.g., a diffraction grating of a multiview pixel, as described below) may be employed to diffractively scatter or couple light out of a light guide (e.g., a plate light guide) as a light beam. In particular, a diffraction angle $\theta_m$ f or provided by a locally periodic diffraction grating may be given by equation (1) as:

$$\theta_m = \sin^{-1}\left(n\sin\theta_i - \frac{m\lambda}{d}\right) \quad (1)$$

where $\lambda$ is a wavelength of the light, m is a diffraction order, n is an index of refraction of a light guide, d is a distance or spacing between features of the diffraction grating, $\theta_i$ is an angle of incidence of light on the diffraction grating. For simplicity, equation (1) assumes that the diffraction grating is adjacent to a surface of the light guide and a refractive index of a material outside of the light guide is equal to one (i.e., $n_{out}=1$). In general, the diffraction order m is given by an integer. A diffraction angle $\theta_m$ of a light beam produced by the diffraction grating may be given by equation (1) where the diffraction order is positive (e.g., m>0). For example, first-order diffraction is provided when the diffraction order m is equal to one (i.e., m=1).

Figure 2:
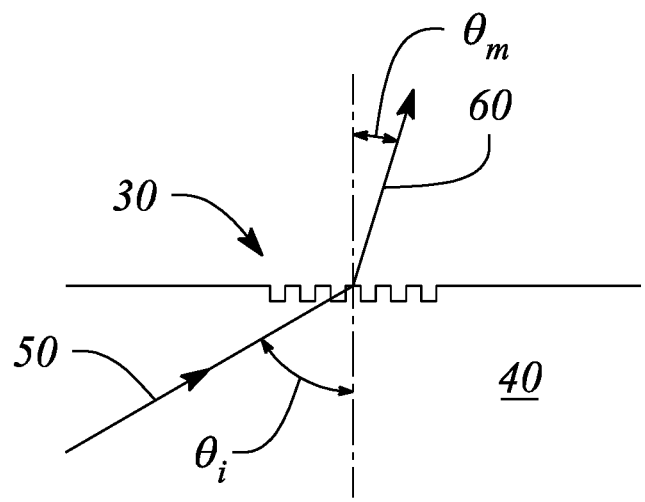
FIG. 2 illustrates a cross-sectional view of a diffraction grating in an example, according to an embodiment consistent with the principles described herein.

FIG. 2 illustrates a cross-sectional view of a diffraction grating 30 in an example, according to an embodiment consistent with the principles described herein. For example, the diffraction grating 30 may be located on a surface of a light guide 40. In addition, FIG. 2 illustrates a light beam (or a collection of light beams) 50 incident on the diffraction grating 30 at an incident angle $\theta_i$. The light beam 50 is a guided light beam within the light guide 40. Also illustrated in FIG. 2 is a coupled-out light beam (or a collection of light beams) 60 diffractively produced and coupled-out by the diffraction grating 30 as a result of diffraction of the incident light beam 20. The coupled-out light beam 60 has a diffraction angle $\theta_m$ (or 'principal angular direction' herein) as given by equation (1). The coupled-out light beam 60 may correspond to a diffraction order 'm' of the diffraction grating 30, for example.

According to various embodiments, the principal angular direction of the various light beams is determined by the grating characteristic including, but not limited to, one or more of a size (e.g., a length, a width, an area, etc.) of the diffraction grating, an orientation, and a feature spacing. Further, a light beam produced by the diffraction grating has a principal angular direction given by angular components $\{\theta, \phi\}$, by definition herein, and as described above with respect to FIG. 1B.

Herein, a 'collimated light' or 'collimated light beam' is generally defined as a beam of light in which rays of the light beam are substantially parallel to one another within the light beam (e.g., the guided light beam in the light guide). Further, rays of light that diverge or are scattered from the collimated light beam are not considered to be part of the collimated light beam, by definition herein. Moreover, herein a 'collimator' is defined as substantially any optical device or apparatus that is configured to collimate light.

Herein, a 'collimation factor' is defined as a degree to which light is collimated. In particular, a collimation factor defines an angular spread of light rays within a collimated beam of light, by definition herein. For example, a collimation factor $\sigma$ may specify that a majority of light rays in a beam of collimated light is within a particular angular spread (e.g., +/−$\sigma$ degrees about a central or principal angular direction of the collimated light beam). The light rays of the collimated light beam may have a Gaussian distribution in terms of angle and the angular spread be an angle determined by at one-half of a peak intensity of the collimated light beam, according to some examples.

Herein, a 'light source' is defined as a source of light (e.g., an optical emitter configured to produce and emit light). A 'multicolor light source' is a source of light having or comprising a selectable color of the emitted light. For example, the light source may comprise an optical emitter such as a light emitting diode (LED) that emits light when activated or turned on. Likewise, the multicolor light source may comprise a color-selectable or color-variable optical emitter or a plurality of optical emitters of different colors that provides different colors of the emitted light in a selectable manner. For example, the multicolor light source may comprise a plurality of different color optical emitters such as a plurality of different color LEDs that emit different colors of light when activated.

In particular, herein the multicolor light source may be substantially any source of light or comprise substantially any optical emitter including, but not limited to, one or more of a light emitting diode (LED), a laser, an organic light emitting diode (OLED), a polymer light emitting diode, a plasma-based optical emitter, a fluorescent lamp, an incandescent lamp, and virtually any other source of light that may be rendered or configured to be color-selectable. The light produced by the multicolor light source may have a plurality of different colors (i.e., may include a plurality of different particular wavelengths of light). In some embodiments, the light source may comprise a plurality of different color optical emitters. For example, the light source may include a set or group of optical emitters in which at least one of the optical emitters produces light having a color, or equivalently a wavelength, that differs from a color or wavelength of light produced by at least one other optical emitter of the set or group. The different colors may include primary colors (e.g., red, green, blue) for example. Further, the selectable color may be provided by combining the different colors of light produced by the various optical emitters, according to various embodiments.

Further, as used herein, the article 'a' is intended to have its ordinary meaning in the patent arts, namely 'one or more'. For example, 'a diffraction grating' means one or more diffraction gratings and as such, 'the diffraction grating' means 'the diffraction grating(s)' herein. Also, any reference herein to 'top', 'bottom', 'upper', 'lower', 'up', 'down', 'front', back', 'first', 'second', 'left' or 'right' is not intended to be a limitation herein. Herein, the term 'about' when applied to a value generally means within the tolerance range of the equipment used to produce the value, or may mean plus or minus 10%, or plus or minus 5%, or plus or minus 1%, unless otherwise expressly specified. Further, the term 'substantially' as used herein means a majority, or almost all, or all, or an amount within a range of about 51% to about 100%. Moreover, examples herein are intended to be illustrative only and are presented for discussion purposes and not by way of limitation.

Figure 3A:
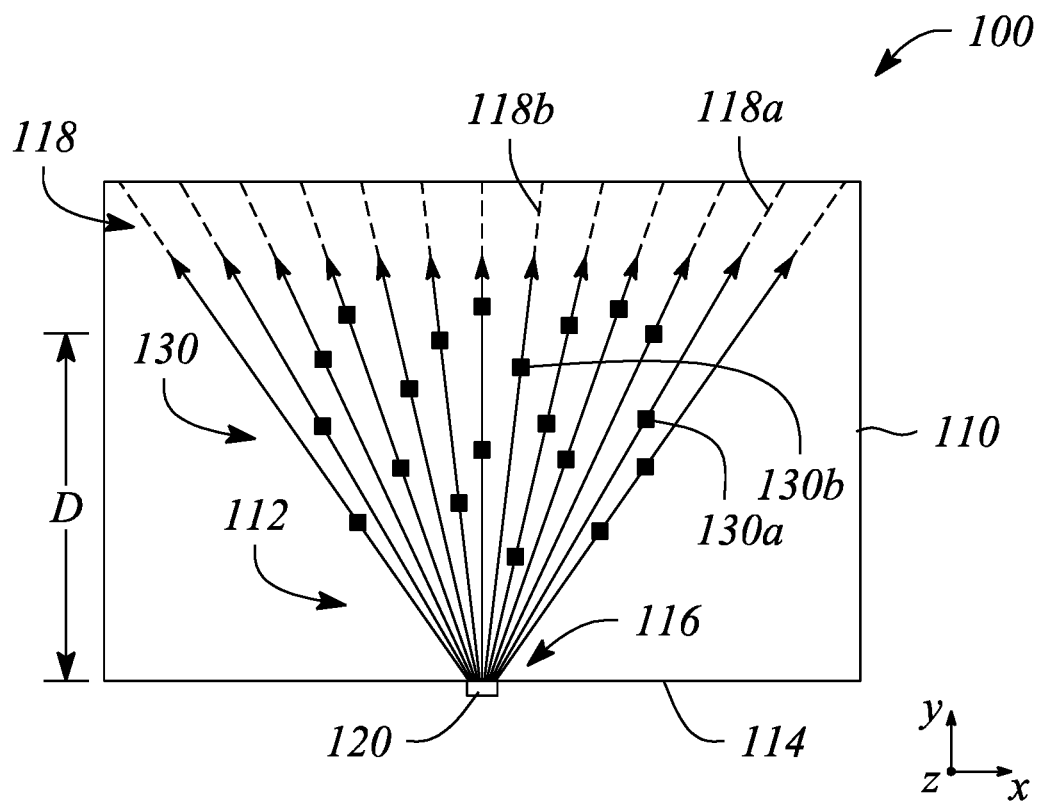
FIG. 3A illustrates a plan view of a multicolor static multiview display in an example, according to an embodiment consistent with the principles described herein.
Figure 3B:
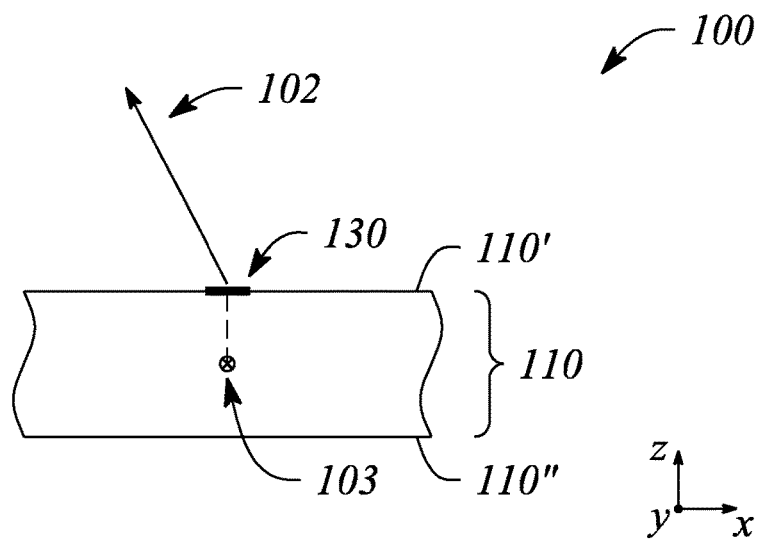
FIG. 3B illustrates a cross-sectional view of a portion of a multicolor static multiview display in an example, according to an embodiment consistent with the principles described herein.
Figure 3C:
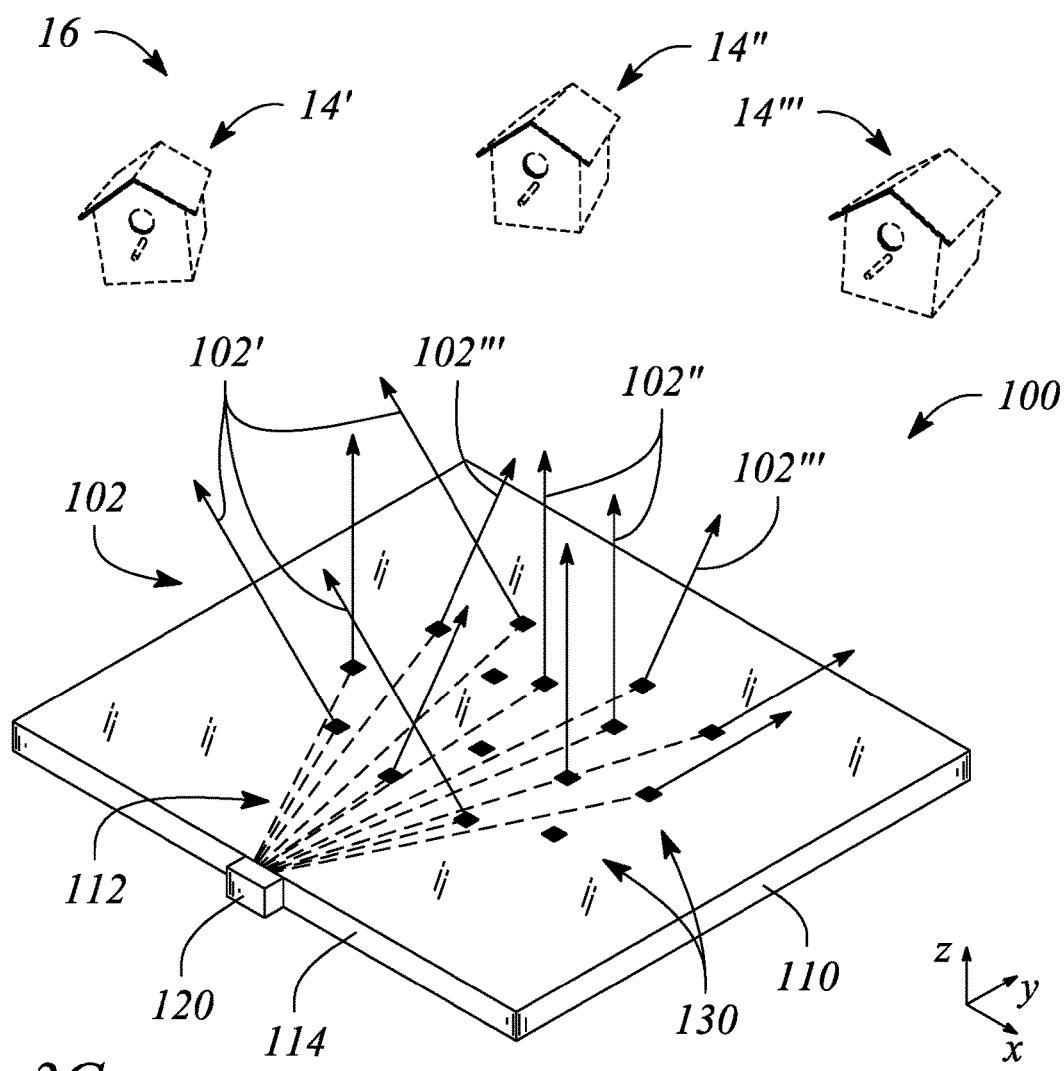
FIG. 3C illustrates a perspective view of a multicolor static multiview display in an example, according to an embodiment consistent with the principles described herein.

According to some embodiments of the principles described herein, a multiview display configured to provide multiview images and more particularly color static multiview images is provided. FIG. 3A illustrates a plan view of a multicolor static multiview display 100 in an example, according to an embodiment consistent with the principles described herein. FIG. 3B illustrates a cross-sectional view of a portion of a multicolor static multiview display 100 in an example, according to an embodiment consistent with the principles described herein. In particular, FIG. 3B may illustrate a cross section through a portion of the multicolor static multiview display 100 of FIG. 3A, the cross section being in an x-z plane. FIG. 3C illustrates a perspective view of a multicolor static multiview display 100 in an example, according to an embodiment consistent with the principles described herein. According to some embodiments, the illustrated multicolor static multiview display 100 is configured to provide a single color static multiview image, while in others the multicolor static multiview display 100 may be configured to provide a plurality of color multiview images and therefore functions as (or is) a color quasi-static multiview display 100. For example, the multicolor static multiview display 100 may be switchable between different fixed color multiview images or equivalently between a plurality of color multiview image states, as described below.

The multicolor static multiview display 100 illustrated in FIGS. 3A-3C is configured to provide a plurality of directional light beams 102, each directional light beam 102 of the plurality having an intensity and a principal angular direction. Together, the plurality of directional light beams 102 has a selectable color and represents various color view pixels of a set of views of a color multiview image that the multicolor static multiview display 100 is configured to provide or display. In some embodiments, the color view pixels may be organized into multiview pixels to represent the various different views of the color multiview images. Further, the color view pixels comprise a color and more particularly a selectable color of the multicolor static multiview display 100.

As illustrated, the multicolor static multiview display 100 comprises a light guide 110. The light guide may be a plate light guide (as illustrated), for example. The light guide 110 is configured to guide light along a length of the light guide 110 as guided light or more particularly as guided light beams 112. For example, the light guide 110 may include a dielectric material configured as an optical waveguide. The dielectric material may have a first refractive index that is greater than a second refractive index of a medium surrounding the dielectric optical waveguide. The difference in refractive indices is configured to facilitate total internal reflection of the guided light beams 112 according to one or more guided modes of the light guide 110, for example.

In some embodiments, the light guide 110 may be a slab or plate optical waveguide comprising an extended, substantially planar sheet of optically transparent, dielectric material. The substantially planar sheet of dielectric material is configured to guide the guided light beams 112 using total internal reflection. According to various examples, the optically transparent material of the light guide 110 may include or be made up of any of a variety of dielectric materials including, but not limited to, one or more of various types of glass (e.g., silica glass, alkali-aluminosilicate glass, borosilicate glass, etc.) and substantially optically transparent plastics or polymers (e.g., poly(methyl methacrylate) or 'acrylic glass', polycarbonate, etc.). In some examples, the light guide 110 may further include a cladding layer (not illustrated) on at least a portion of a surface (e.g., one or both of the top surface and the bottom surface) of the light guide 110. The cladding layer may be used to further facilitate total internal reflection, according to some examples.

According to various embodiments, the light guide 110 is configured to guide the guided light beams 112 according to total internal reflection at a non-zero propagation angle between a first surface 110' (e.g., a 'front' surface) and a second surface 110" (e.g., a 'back' or 'bottom' surface) of the light guide 110. In particular, the guided light beams 112 propagate by reflecting or 'bouncing' between the first surface 110' and the second surface 110" of the light guide 110 at the non-zero propagation angle. Note, the non-zero propagation angle is not explicitly depicted in FIG. 3B for simplicity of illustration. However, FIG. 3B does illustrate an arrow pointing into a plane of the illustration depicting a general propagation direction 103 of the guided light beams 112 along the light guide length.

As defined herein, a 'non-zero propagation angle' is an angle relative to a surface (e.g., the first surface 110' or the second surface 110") of the light guide 110. Further, the non-zero propagation angle is both greater than zero and less than a critical angle of total internal reflection within the light guide 110, according to various embodiments. For example, the non-zero propagation angle of the guided light beam 112 may be between about ten (10) degrees and about fifty (50) degrees or, in some examples, between about twenty (20) degrees and about forty (40) degrees, or between about twenty-five (25) degrees and about thirty-five (35) degrees. For example, the non-zero propagation angle may be about thirty (30) degrees. In other examples, the non-zero propagation angle may be about 20 degrees, or about 25 degrees, or about 35 degrees. Moreover, a specific non-zero propagation angle may be chosen (e.g., arbitrarily) for a particular implementation as long as the specific non-zero propagation angle is chosen to be less than the critical angle of total internal reflection within the light guide 110.

As illustrated in FIGS. 3A and 3C, the multicolor static multiview display 100 further comprise a multicolor light source 120. The multicolor light source 120 is located at an input location 116 on the light guide 110. For example, the multicolor light source 120 may be located adjacent to an edge or side 114 of the light guide 110, as illustrated. The multicolor light source 120 is configured to provide light within the light guide 110 as the plurality of guided light beams 112. The plurality of guided light beams 112 comprise a selectable color of light or simply a 'selectable color'. Further, the multicolor light source 120 provides the light such that individual guided light beams 112 of the guided light beam plurality have different radial directions 118 from one another.

In particular, light emitted by the multicolor light source 120 is configured enter the light guide 110 and to propagate as the plurality of guided light beams 112 in a radial pattern away from the input location 116 and across or along a length of the light guide 110. Further, the individual guided light beams 112 of the guided light beam plurality have different radial directions from one another by virtue of the radial pattern of propagation away from the input location 116. For example, the multicolor light source 120 may be butt-coupled to the side 114. The multicolor light source 120 being butt-coupled may facilitate introduction of light in a fan-shape pattern to provide the different radial directions of the individual guided light beams 112, for example. According to some embodiments, the multicolor light source 120 may be or at least approximate a 'point' source of light at the input location 116 such that the guided light beams 112 propagate along the different radial directions 118 (i.e., as the plurality of guided light beams 112).

In some embodiments, the input location 116 of the multicolor light source 120 is on a side 114 of the light guide 110 near or about at a center or a middle of the side 114. In particular, in FIGS. 3A and 3C, the multicolor light source 120 is illustrated at an input location 116 that is approximately centered on (e.g., at a middle of) the side 114 (i.e., the 'input side') of the light guide 110. Alternatively (not illustrated), the input location 116 may be away from the middle of the side 114 of the light guide 110. For example, the input location 116 may be at a corner of the light guide 110. For example, the light guide 110 may have a rectangular shape (e.g., as illustrated) and the input location 116 of the multicolor light source 120 may be at a corner of the rectangular-shaped light guide 110 (e.g., a corner of the input side 114).

In various embodiments, the multicolor light source 120 may comprise substantially any source of light (e.g., optical emitter) configured to provide a selectable color of light including, but not limited to, one or more light emitting diodes (LEDs) or a laser (e.g., laser diode). In some embodiments, the multicolor light source 120 may comprise an optical emitter configured produce a substantially monochromatic light having a narrowband spectrum denoted by a particular color (e.g., a first color). In particular, the color of the monochromatic light may be a primary color of a particular color space or color model (e.g., an RGB color model). The multicolor light source 120 may thus comprise a plurality of different color optical emitters that produce different colors of substantially monochromatic light to facilitate emission of the selectable color of light, for example. In other examples, the multicolor light source 120 may be a substantially broadband light source configured to provide substantially broadband or polychromatic light comprising a selectable output color. For example, the multicolor light source 120 may provide white light, a band of which may be selected to provide the selectable color of light (or selectable color). Selection of the selectable color may be provided by a control input to the multicolor light source 120, for example. In another example, color selection may be provided by a variable color filter at an output of the multicolor light source 120.

As mentioned above, the multicolor light source 120 may comprise a plurality of color optical emitters configured to provide different colors of light. The different optical emitters may be configured to provide light having different, color-specific, non-zero propagation angles of the guided light corresponding to each of the different colors of light. Further, in some embodiments, optical emitters of the optical emitter plurality configured to provide a first color (e.g., red) of the different colors of light may be interlaced or interspersed with optical emitters configured to provide a second or another color (e.g., green or blue) of the different colors of light within the multicolor light source 120. For example, the plurality of color optical emitters may comprise a red light emitting diode, a green light emitting diode, and a blue light emitting diode. Thus, the different colors of light may be red light, green light, and blue light such that the selectable color is provided as a selectable combination of the red, green and blue light. The selectable combination may be controlled by a relative emission intensity of the red, green, blue light emitting diodes, for example. Further in the example, the red, green, and blue light emitting diodes may be interlaced or interspersed with one another across an extent or a width of the multicolor light source 120.

Figure 4A:
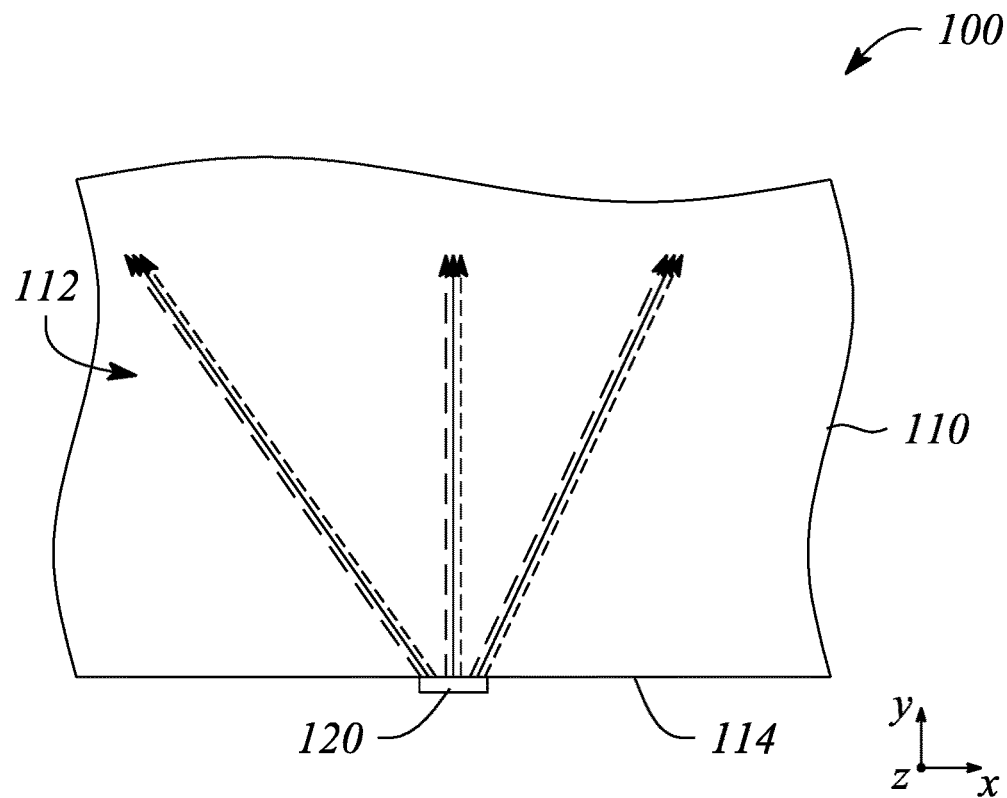
FIG. 4A illustrates a plan view of a portion of a multicolor static multiview display including a multicolor light source in an example, according to an embodiment consistent with the principles described herein.
Figure 4B:
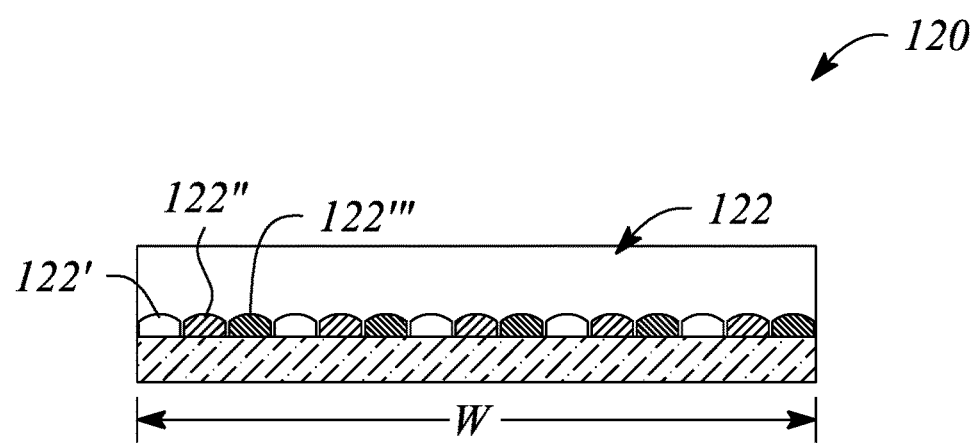
FIG. 4B illustrates a cross-sectional view of a multicolor light source in an example, according to an embodiment consistent with the principles described herein.

FIG. 4A illustrates a plan view of a portion of a multicolor static multiview display 100 including a multicolor light source 120 in an example, according to an embodiment consistent with the principles described herein. FIG. 4B illustrates a cross-sectional view of a multicolor light source 120 in an example, according to an embodiment consistent with the principles described herein. In particular, FIG. 4A illustrates the multicolor light source 120 as being butt-coupled to the side 114 of the light guide 110 of the multicolor static multiview display 100. Different types of arrows (solid, long dash, and short dash) represent different colors of light within guided light beams 112 produced by the multicolor light source 120. The different colors combine to provide the selectable color of the guided light beams 112, as illustrated.

The multicolor light source 120 illustrated in FIG. 4B comprises a plurality of color optical emitters 122 configured to provide different colors of light. Further, as illustrated, the color optical emitters 122 comprise a first optical emitter 122' configured to provide a first color of light (e.g., red light), a second optical emitter 122" configured to provide a second color of light (e.g., green light), and a third optical emitter 122''' configured to provide a third color of light (e.g., blue light). For example, the plurality of color optical emitters 122 may comprise a plurality of different color light emitting diodes (LEDs). The first optical emitter 122' may be a red LED, the second optical emitter 122" may be a green LED, and the third optical emitter 122''' may be a blue LED, for example. Further, the first optical emitter 122', the second optical emitter 122", and third optical emitter 122''' are interlaced within an extent W of the multicolor light source 120, as illustrated. That is, the first, second and third optical emitters 122', 122", 122''' are small enough to fit within the multicolor light source extent W and further alternate with each other across the extent W as illustrated. Interlacing of the color optical emitters 122 having different colors may facilitate combining or 'blending together' the different colors of light produced, for example. Further, interlacing may also result in light rays of different colors within the guided light beams 112 having substantially the same propagation direction (i.e., a common direction of the guided light beam 112, as illustrated in FIG. 4A). Note that the extent W may be chosen to determine or be used to control an angular spread of a color view pixel, according to some embodiments.

In some embodiments, the guided light beams 112 comprising or having a selectable color produced by coupling light from the multicolor light source 120 into the light guide 110 may be uncollimated or at least substantially uncollimated. In other embodiments, the guided light beams 112 may be collimated (i.e., the guided light beams 112 may be collimated light beams). As such, in some embodiments, the multicolor static multiview display 100 may include a collimator (not illustrated) between the multicolor light source 120 and the light guide 110. Alternatively, the multicolor light source 120 may further comprise a collimator. The collimator is configured to provide guided light beams 112 within the light guide 110 that are collimated. In particular, the collimator is configured to receive substantially uncollimated light from one or more of the optical emitters of the multicolor light source 120 and to convert the substantially uncollimated light into collimated light. In some examples, the collimator may be configured to provide collimation in a plane (e.g., a 'vertical' plane) that is substantially perpendicular to the propagation direction of the guided light beams 112. That is, the collimation may provide collimated guided light beams 112 having a relatively narrow angular spread in a plane perpendicular to a surface of the light guide 110 (e.g., the first or second surface 110', 110"), for example. According to various embodiments, the collimator may comprise any of a variety of collimators including, but not limited to a lens, a reflector or mirror (e.g., tilted collimating reflector), or a diffraction grating (e.g., a diffraction grating-based barrel collimator) configured to collimate the light, e.g., from the multicolor light source 120.

Further, in some embodiments, the collimator may provide collimated light one or both of having the non-zero propagation angle and being collimated according to a predetermined collimation factor. Moreover, when optical emitters of different colors are employed, the collimator may be configured to provide the collimated light having one or both of different, color-specific, non-zero propagation angles and having different color-specific collimation factors. The collimator is further configured to communicate the collimated light to the light guide 110 to propagate as the guided light beams 112, in some embodiments.

Use of collimated or uncollimated light may impact the color multiview image that may be provided by the multicolor static multiview display 100, in some embodiments. For example, if the guided light beams 112 comprising or having a selectable color are collimated within the light guide 110, the emitted directional light beams 102 also comprising or having the selectable color may have a relatively narrow or confined angular spread in at least two orthogonal directions. Thus, the multicolor static multiview display 100 may provide a color multiview image having a plurality of different views in an array having two different directions (e.g., an x-direction and a y-direction). However, if the guided light beams 112 are substantially uncollimated, the color multiview image may provide view parallax, but may not provide a full, two-dimensional array of different views. In particular, if the guided light beams 112 are uncollimated (e.g., along the z-axis), the color multiview image may provide different color multiview images exhibiting 'parallax 3D' when rotated about the y-axis (e.g., as illustrated in FIG. 1A). On the other hand, if the multicolor static multiview display 100 is rotated around the x-axis, for example, the color multiview image and views thereof may remain substantially unchanged or the same because the directional light beams 102 of the directional light beam plurality have a broad angular range within the y-z plane. Thus, the color multiview image provided may be 'parallax only' providing an array of views in only one direction and not two.

Referring again to FIGS. 3A-3C, the illustrated multicolor static multiview display 100 further comprises a plurality of diffraction gratings 130 configured to emit directional light beams 102 of the directional light beam plurality. As mentioned above and according to various embodiments, the directional light beams 102 emitted by the plurality of diffraction gratings 130 may represent a color multiview image. In particular, the directional light beams 102 emitted by the plurality of diffraction gratings 130 may be configured to create the color multiview image to display information, e.g., information having 3D content. Further, the diffraction gratings 130 may emit the directional light beams 102 comprising the selectable color when the light guide 110 is illuminated from the side 114 by the multicolor light source 120, as is further described below.

According to various embodiments, a diffraction grating 130 of the diffraction grating plurality are configured to provide from a portion of a guided light beam 112 of the guided light beam plurality a directional light beam 102 of the directional light beam plurality. Further, the diffraction grating 130 is configured to provide the directional light beam 102 having both an intensity and a principal angular direction corresponding to an intensity and a view direction of a color view pixel of the color multiview image. In some embodiments, the diffraction gratings 130 of the diffraction grating plurality generally do not intersect, overlap or otherwise touch one another, according to some embodiments. That is, each diffraction grating 130 of the diffraction grating plurality is generally distinct and separated from other ones of the diffraction gratings 130, according to various embodiments.

As illustrated in FIG. 3B, the directional light beams 102 may, at least in part, propagate in a direction that differs from and in some embodiments is orthogonal to an average or general propagation direction 103 of a guided light beams 112 within the light guide 110. For example, as illustrated in FIG. 3B, the directional light beam 102 from a diffraction grating 130 may be substantially confined to the x-z plane, according to some embodiments.

According to various embodiments, each of the diffraction gratings 130 of the diffraction grating plurality has an associated grating characteristic. The associated grating characteristic of each diffraction grating depends on, is defined by, or is a function of a radial direction 118 of the guided light beam 112 incident on the diffraction grating from the multicolor light source 120. Further, in some embodiment, the associated grating characteristic is further determined or defined by a distance between the diffraction grating 130 and the input location 116 of the multicolor light source 120. For example, the associated characteristic may be a function of the distance D between diffraction grating 130a and input location 116 and the radial direction 118a of the guided light beam 112 incident on the diffraction grating 130a, as illustrated in FIG. 3A. Stated differently, an associated grating characteristic of a diffraction grating 130 in the plurality of the diffraction gratings 130 depends on the input location 116 of the light source and a particular location of the diffraction grating 130 on a surface of the light guide 110 relative to the input location 116.

FIG. 3A illustrates two different diffraction gratings 130a and 130b having different spatial coordinates $(x_1, y_1)$ and $(x_2, y_2)$, which further have different grating characteristics to compensate or account for the different radial directions 118a and 118b of the plurality of guided light beams 112 from the multicolor light source 120 that are incident on the diffraction gratings 130. Similarly, the different grating characteristics of the two different diffraction gratings 130a and 130b account for different distances of the respective diffraction gratings 130a, 130b from the light source input location 116 determined by the different spatial coordinates $(x_1, y_1)$ and $(x_2, y_2)$.

FIG. 3C illustrates an example of a plurality of directional light beams 102 that may be provided by the multicolor static multiview display 100. In particular, as illustrated, different sets of diffraction gratings 130 of the diffraction grating plurality are illustrated emitting directional light beams 102 having different principal angular directions from one another. The different principal angular directions may correspond to different view directions of the multicolor static multiview display 100, according to various embodiments. For example, a first set of the diffraction gratings 130 may diffractively couple out portions of incident guided light beams 112 (illustrated as dashed lines) to provide a first set of directional light beams 102' having a first principal angular direction corresponding to a first view direction (or a first view) of the multicolor static multiview display 100. Similarly, a second set of directional light beams 102" and a third set of directional light beams 102'" having principal angular directions corresponding to a second view direction (or a second view) and a third view direction (or third view), respectively of the multicolor static multiview display 100 may be provided by diffractive coupling out of portions of incident guided light beams 112 by respective second third sets of diffraction gratings 130, and so on, as illustrated. Also illustrated in FIG. 3C are a first view 14', a second view 14", and a third view 14'", of a color multiview image 16 that may be provided by the multiview display 100. The illustrated first, second, and third views 14', 14", 14'", represent different perspective views of an object and collectively are the displayed color multiview image 16 (e.g., equivalent to the color multiview image 16 illustrated in FIG. 1A).

In general, the grating characteristic of a diffraction grating 130 may include one or more of a diffractive feature spacing or pitch, a grating orientation and a grating size (or extent) of the diffraction grating. Further, in some embodiments, a diffraction-grating coupling efficiency (such as the diffraction-grating area, the groove depth or ridge height, etc.) may be a function of the distance from the input location 116 to the diffraction grating. For example, the diffraction grating coupling efficiency may be configured to increase as a function of distance, in part, to correct or compensate for a general decrease in the intensity of the guided light beams 112 associated with the radial spreading and other loss factors. Thus, an intensity of the directional light beam 102 provided by the diffraction grating 130 and corresponding to an intensity of a corresponding view pixel may be determined, in part, by a diffractive coupling efficiency of the diffraction grating 130, according to some embodiments.

Figure 5:
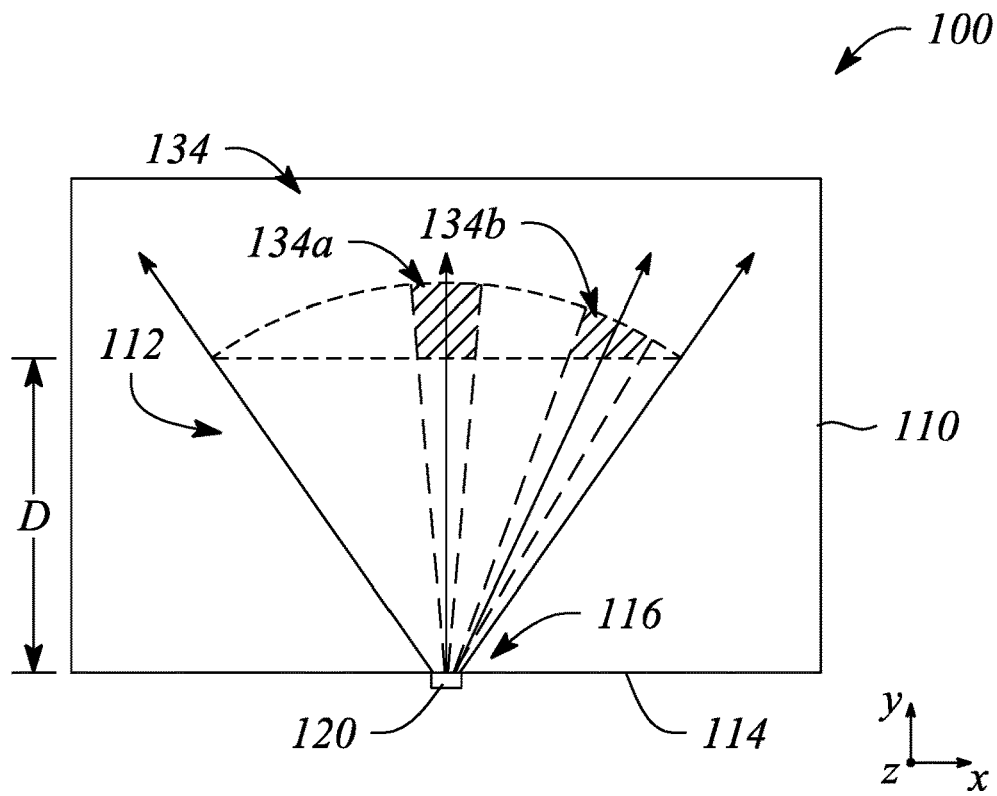
FIG. 5 illustrates a plan view of a multicolor static multiview display in an example, according to an embodiment consistent with the principles described herein.

FIG. 5 illustrates a plan view of a multicolor static multiview display 100 in an example, according to an embodiment consistent with the principles described herein. In FIG. 5, illumination volumes 134 in an angular space that is a distance D from input location 116 of the multicolor light source 120 at the side 114 of the light guide 110 are shown. Note that the illumination volume has a wider angular size as the radial direction of propagation of the plurality of guided light beams 112 changes in angle away from they-axis and towards the x-axis. For example, illumination volume 134b is wider than illumination volume 134a, as illustrated.

Referring again to FIG. 3B, the plurality of diffraction gratings 130 may be located at or adjacent to the first surface 110' of the light guide 110, which is the light beam emission surface of the light guide 110, as illustrated. For example, the diffraction gratings 130 may be transmission mode diffraction gratings configured to diffractively couple out the guided light portion through the first surface 110' as the directional light beams 102. Alternatively, the plurality of diffraction gratings 130 may be located at or adjacent to the second surface 110" opposite from a light beam emission surface of the light guide 110 (i.e., the first surface 110'). In particular, the diffraction gratings 130 may be reflection mode diffraction gratings. As reflection mode diffraction gratings, the diffraction gratings 130 are configured to both diffract the guided light portion and to reflect the diffracted guided light portion toward the first surface 110' to exit through the first surface 110' as the diffractively scattered or coupled-out directional light beams 102. In other embodiments (not illustrated), the diffraction gratings 130 may be located between the surfaces of the light guide 110, e.g., as one or both of a transmission mode diffraction grating and a reflection mode diffraction grating.

In some embodiments described herein, the principal angular directions of the directional light beams 102 may include an effect of refraction due to the directional light beams 102 exiting the light guide 110 at a light guide surface. For example, when the diffraction gratings 130 are located at or adjacent to second surface 110", the directional light beams 102 may be refracted (i.e., bent) because of a change in refractive index as the directional light beams 102 cross the first surface 110', by way of example and not limitation.

According to some embodiment, the multicolor static multiview display 100 may comprise a plurality of multicolor light sources 120 that are laterally offset from one another. The lateral offset of multicolor light sources 120 of the light source plurality may provide a difference in the radial directions of various guided light beams 102 at or between individual diffraction gratings 130. The difference, in turn, may facilitate providing animation of a displayed color multiview image, according to some embodiments. Thus, the multicolor static multiview display 100 may be a multicolor quasi-static multiview display 100, in some embodiments.

Figure 6A:
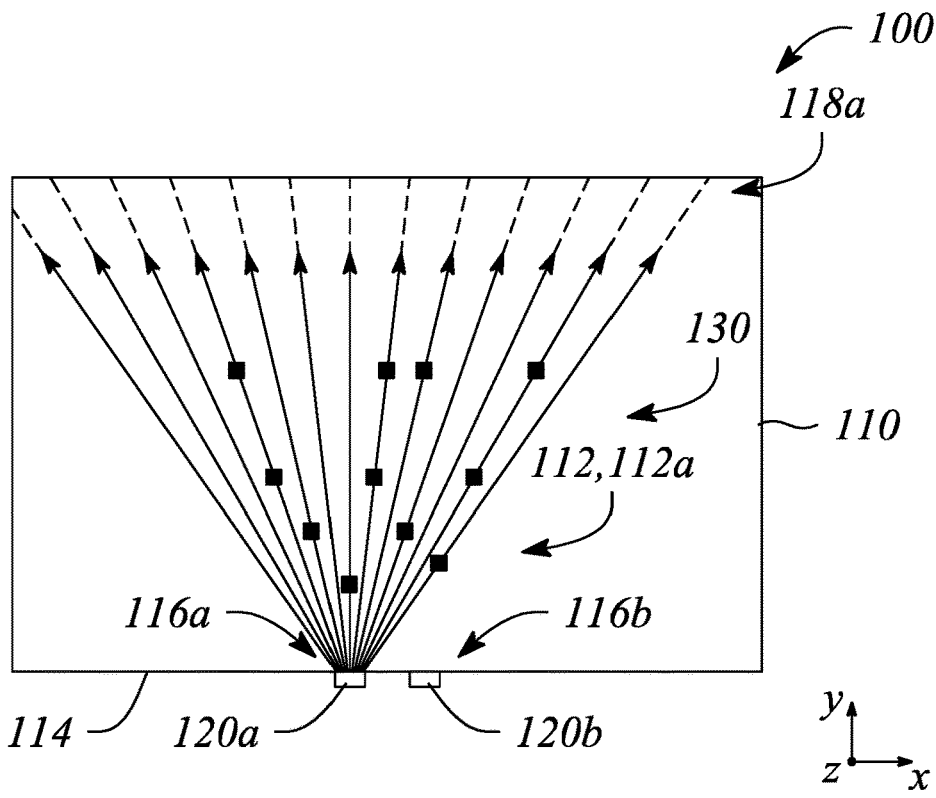
FIG. 6A illustrates a plan view of a multiview display in an example, according to an embodiment consistent with the principles described herein.
Figure 6B:
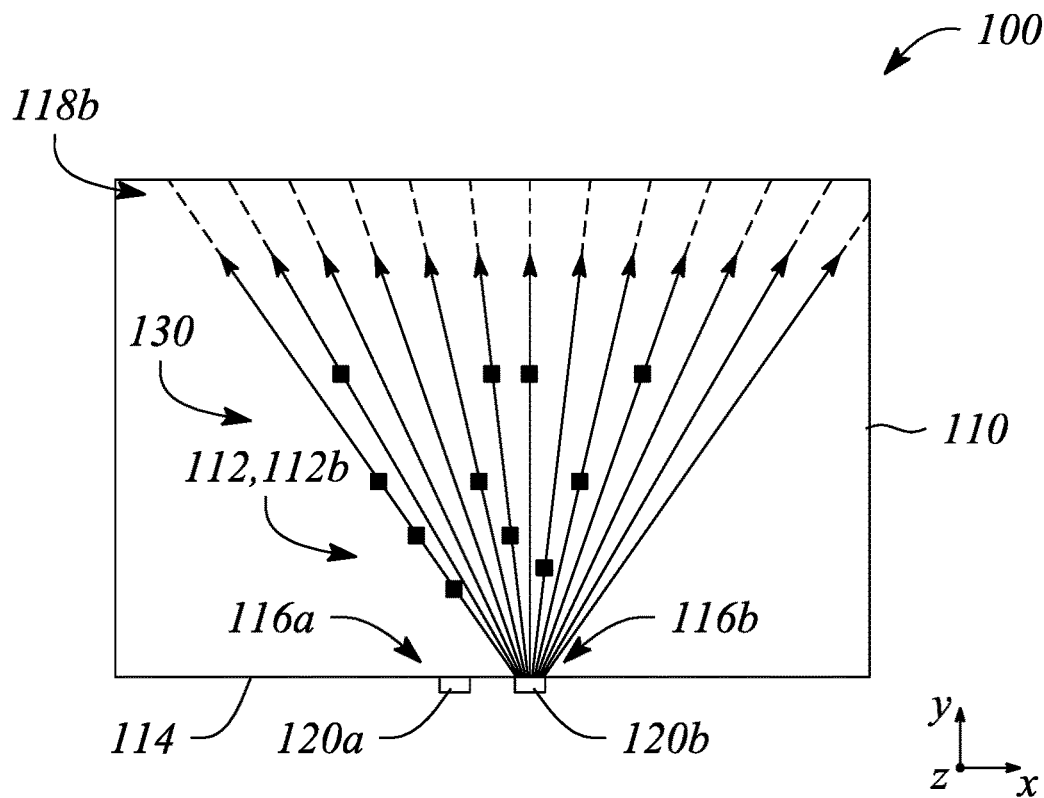
FIG. 6B illustrates a plan view of the multicolor static multiview display of FIG. 6A in another example, according to an embodiment consistent with the principles described herein.

FIG. 6A illustrates a plan view of a multicolor static multiview display 100 in an example, according to an embodiment consistent with the principles described herein. FIG. 6B illustrates a plan view of the multicolor static multiview display 100 of FIG. 6A in another example, according to an embodiment consistent with the principles described herein. The multicolor static multiview display 100 illustrated in FIGS. 6A and 6B comprises a light guide 110 with a plurality of diffraction gratings 130. In addition, the multicolor static multiview display 100 further comprises a plurality of multicolor light sources 120 that are laterally offset from each other and configured to separately provide guided light beams 112 having different radial directions 118 from one another, as illustrated.

In particular, FIGS. 6A and 6B illustrate a first multicolor light source 120a at a first input location 116a and a second multicolor light source 120b at a second input location 116b on the side 114 of the light guide 110. The first and second input locations 116a, 116b are laterally offset or shifted from one another along the side 114 (i.e., in an x-direction) to provide the lateral offset of respective first and second multicolor light sources 120a, 120b. Additionally, each of the first and second multicolor light sources 120a, 120b of the plurality of multicolor light sources 120 provide a different plurality of guided light beams 112 comprising a selectable color and having respective different radial directions from one another. For example, the first multicolor light source 120a may provide a first plurality of guided light beams 112a having a first set of different radial directions 118a and the second multicolor light source 120b may provide a second plurality of guided light beams 112b having a second set of different radial directions 118b, as illustrated in FIGS. 6A and 6B, respectively. Further, the first and second pluralities of guided light beams 112a, 112b generally have sets of different radial directions 118a, 118b that also differ from one another as sets by virtue of the lateral offset of the first and second multicolor light sources 120a, 120b, as illustrated.

Thus, the plurality of diffraction gratings 130 emit directional light beams representing different color multiview images that are shifted in a view space from one another (e.g., angularly shifted in view space). Thus, by switching between the first and second multicolor light sources 120a, 120b, the multicolor static multiview display 100 may provide 'animation' of the color multiview images, such as a time-sequenced animation. In particular, by sequentially illuminating the first and second multicolor light sources 120a, 120b during different sequential time intervals or periods, multicolor static multiview display 100 may be configured to shift an apparent location of the color multiview image during the different time periods, for example. This shift in apparent location provided by the animation may represent and example of operating the multicolor static multiview display 100 as a multicolor quasi-static multiview display 100 to provide a plurality of color multiview image states, according to some embodiments.

In addition, the selectable color provided by the first multicolor light source 120a may be the same or a different color than the selectable color provided by the second multicolor light source 120b, according to various embodiments. As such, the 'animation' may include a change in the color of the color multiview images as a function of time (e.g., in a particular color multiview image) or as a function of color multiview image state.

According to various embodiments, as described above with respect to FIGS. 3A-3C, the directional light beams 102 of the multicolor static multiview display 100 are emitted using diffraction (e.g., by diffractive scattering or diffractive coupling). In some embodiments, the plurality of the diffraction gratings 130 may be organized as multiview pixels, each multiview pixel including a set of diffraction gratings 130 comprising one or more diffraction gratings 130 from the diffraction grating plurality. Further, as has been discussed above, the diffraction grating(s) 130 have diffraction characteristics that are a function of radial location on the light guide 110 as well as being a function of an intensity and direction of the directional light beams 102 emitted by the diffraction grating(s) 130.

Figure 7A:
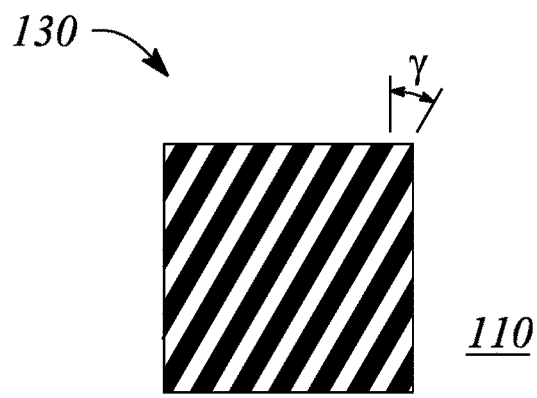
FIG. 7A illustrates a plan view of a diffraction grating of a multiview display in an example, according to an embodiment consistent with the principles described herein.
Figure 7B:
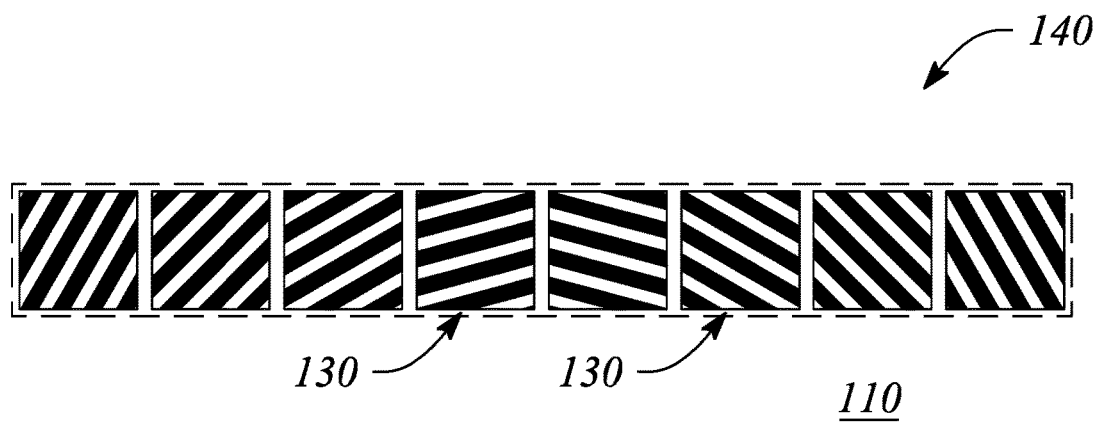
FIG. 7B illustrates a plan view of a set diffraction gratings organized as a multiview pixel in an example, according to another embodiment consistent with the principles described herein.

FIG. 7A illustrates a plan view of a diffraction grating 130 of a multiview display in an example, according to an embodiment consistent with the principles described herein. FIG. 7B illustrates a plan view of a set of diffraction gratings 130 organized as a multiview pixel 140 in an example, according to another embodiment consistent with the principles described herein. As illustrated in FIGS. 7A and 7B, each of the diffraction gratings 130 comprises a plurality of diffractive features spaced apart from one another according to a diffractive feature spacing (which is sometimes referred to as a 'grating spacing') or grating pitch. The diffractive feature spacing or grating pitch is configured to provide diffractive coupling out or scattering of the guided light portion from within the light guide. In FIGS. 7A-7B, the diffraction gratings 130 are on a surface of a light guide 110 of the multiview display (e.g., the multicolor static multiview display 100 illustrated in FIGS. 3A-3C).

According to various embodiments, the spacing or grating pitch of the diffractive features in the diffraction grating 130 may be sub-wavelength (i.e., less than a wavelength of the guided light beams 112). Note that, while FIGS. 7A and 7B illustrate the diffraction gratings 130 having a single or uniform grating spacing (i.e., a constant grating pitch), for simplicity of illustration. In various embodiments, as described below, the diffraction grating 130 may include a plurality of different grating spacings (e.g., two or more grating spacings) or a variable diffractive feature spacing or grating pitch to provide the directional light beams 102, e.g., as is variously illustrated in FIGS. 3A-6B. Consequently, FIGS. 7A and 7B are not intended to imply that a single grating pitch is an exclusive embodiment of diffraction grating 130.

According to some embodiments, the diffractive features of the diffraction grating 130 may comprise one or both of grooves and ridges that are spaced apart from one another. The grooves or the ridges may comprise a material of the light guide 110, e.g., the groove or ridges may be formed in a surface of the light guide 110. In another example, the grooves or the ridges may be formed from a material other than the light guide material, e.g., a film or a layer of another material on a surface of the light guide 110.

As discussed previously and shown in FIG. 7A, the configuration of the diffraction features comprises a grating characteristic of the diffraction grating 130. For example, a grating depth of the diffraction grating may be configured to determine the intensity of the directional light beams 102 provided by the diffraction grating 130. Alternatively or additionally, discussed previously and shown in FIGS. 7A-7B, the grating characteristic comprises one or both of a grating pitch of the diffraction grating 130 and a grating orientation (e.g., the grating orientation γ illustrated in FIG. 7A). In conjunction with the angle of incidence of the guided light beams, these grating characteristics determine the principal angular direction of the directional light beams 102 provided by the diffraction grating 130.

In some embodiments (not illustrated), the diffraction grating 130 configured to provide the directional light beams comprises a variable or chirped diffraction grating as a grating characteristic. By definition, the 'chirped' diffraction grating is a diffraction grating exhibiting or having a diffraction spacing of the diffractive features (i.e., the grating pitch) that varies across an extent or length of the chirped diffraction grating. In some embodiments, the chirped diffraction grating may have or exhibit a chirp of the diffractive feature spacing that varies linearly with distance. As such, the chirped diffraction grating is a 'linearly chirped' diffraction grating, by definition. In other embodiments, the chirped diffraction grating of the multiview pixel may exhibit a non-linear chirp of the diffractive feature spacing. Various non-linear chirps may be used including, but not limited to, an exponential chirp, a logarithmic chirp or a chirp that varies in another, substantially non-uniform or random but still monotonic manner. Non-monotonic chirps such as, but not limited to, a sinusoidal chirp or a triangle or sawtooth chirp, may also be employed. Combinations of any of these types of chirps may also be employed.

In other embodiments, diffraction grating 130 configured to provide the directional light beams 102 is or comprises a plurality of diffraction gratings (e.g., sub-gratings). For example, the plurality of diffraction gratings of the diffraction grating 130 may comprise a first diffraction grating configured to provide a red portion of the directional light beams 102. Further, the plurality of diffraction gratings of the diffraction grating 130 may comprise a second diffraction grating configured to provide a green portion of the directional light beams 102. Further still, the plurality of diffraction gratings of the diffraction grating 130 may comprise a third diffraction grating configured to provide a blue portion of the directional light beams 102. In some embodiments, individual diffraction gratings of the plurality of diffraction gratings may be superimposed on one another. In other embodiments, the diffraction gratings may be separate diffraction gratings arranged next to one another, e.g., as an array.

More generally, the multicolor static multiview display 100 may comprise one or more instances of multiview pixels 140, which each comprise sets of diffraction gratings 130 from the plurality of diffraction gratings 130. As shown in FIG. 7B, the diffraction gratings 130 of the set that makes up a multiview pixel 140 may have different grating characteristics. The diffraction gratings 130 of the multiview pixel may have different grating orientations, for example. In particular, the diffraction gratings 130 of the multiview pixel 140 may have different grating characteristics determined or dictated by a corresponding set of views of a color multiview image. For example, the multiview pixel 140 may include a set of eight (8) diffraction gratings 130 that, in turn, correspond to 8 different views of the multicolor static multiview display 100. Moreover, the multicolor static multiview display 100 may include multiple multiview pixels 140. For example, there may be a plurality of multiview pixels 140 with sets of diffraction gratings 130, each multiview pixels 140 corresponding to a different one of 2048×1024 pixels in each of the 8 different views.

In some embodiments, multicolor static multiview display 100 may be transparent or substantially transparent. In particular, the light guide 110 and the spaced apart plurality of diffraction gratings 130 may allow light to pass through the light guide 110 in a direction that is orthogonal to both the first surface 110' and the second surface 110", in some embodiments. Thus, the light guide 110 and more generally the multicolor static multiview display 100 may be transparent to light propagating in the direction orthogonal to the general propagation direction 103 of the guided light beams 112 of the guided light beam plurality. Further, the transparency may be facilitated, at least in part, by the substantially transparency of the diffraction gratings 130.

In accordance with some embodiments of the principles described herein, a multiview display is provided. The multiview display is configured to emit a plurality of directional light beams provided by the multiview display. Further, the emitted directional light beams may be preferentially directed toward a plurality of views zones of the multiview display based on the grating characteristics of a plurality of diffraction grating that are included in one or more multiview pixels in the multiview display. Moreover, the diffraction gratings may produce different principal angular directions in the directional light beams, which corresponding to different viewing directions for different views in a set of views of the color multiview image of the multicolor multiview display. In some examples, the multicolor multiview display is configured to provide or 'display' a color 3D or multiview image. Different ones of the directional light beams may correspond to individual view pixels of different 'views' associated with the color multiview image, according to various examples. The different views may provide a 'glasses free' (e.g., autostereoscopic) representation of information in the color multiview image being displayed by the multicolor multiview display, for example.

Figure 8:
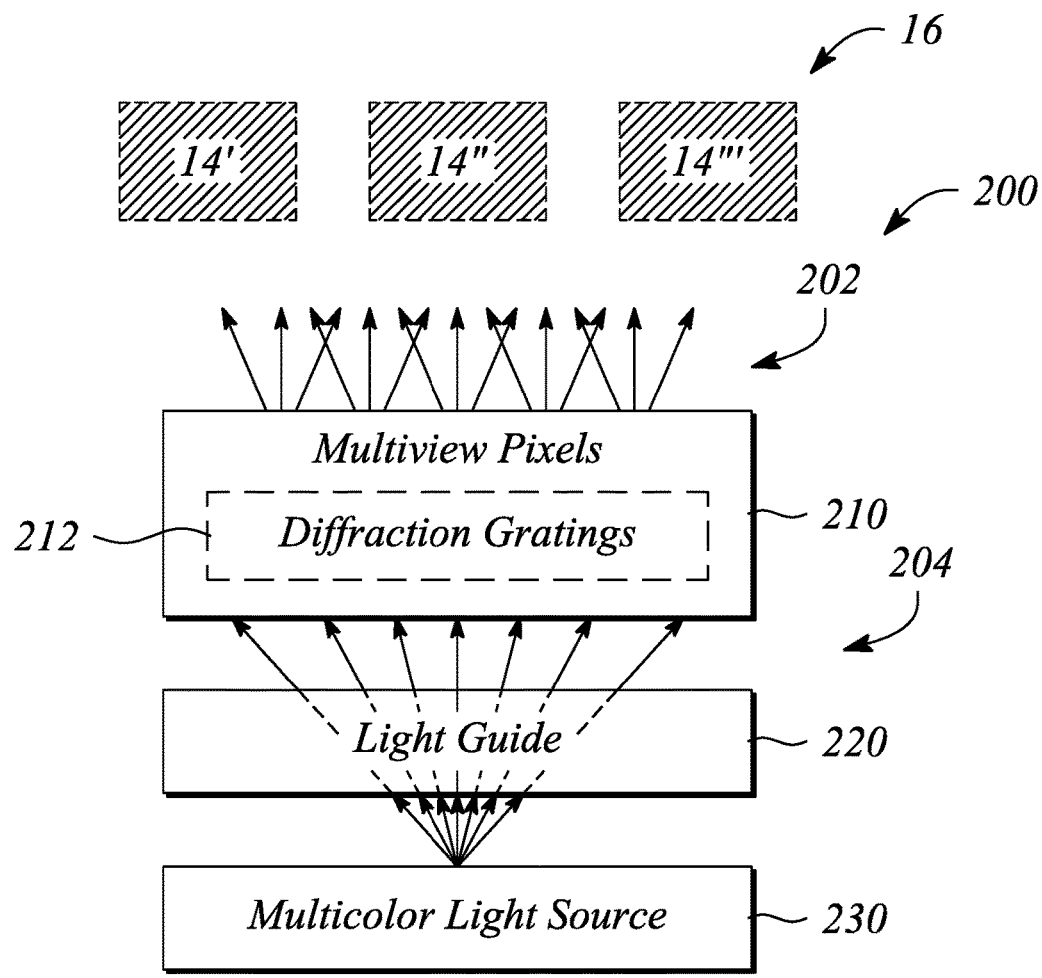
FIG. 8 illustrates a block diagram of a multicolor static multiview display in an example, according to an embodiment consistent with the principles described herein.

FIG. 8 illustrates a block diagram of a multicolor static multiview display 200 in an example, according to an embodiment consistent with the principles described herein. According to various embodiments, the multicolor static multiview display 200 is configured to display a color multiview image according to different views in different view directions. In particular, a plurality of directional light beams 202 emitted by the multicolor static multiview display 200 are used to display the color multiview image and may correspond to color pixels of the different views (i.e., color view pixels). The directional light beams 202 are illustrated as arrows emanating from one or more multiview pixels 210 in FIG. 8. Also illustrated in FIG. 8 are a first view 14', a second view 14", and a third view 14"', of a color multiview image 16 that may be provided by the multicolor static multiview display 200.

Note that the directional light beams 202 associated with one of multiview pixels 210 are either static or quasi-static (i.e., not actively modulated). Instead, the multiview pixels 210 either provide the directional light beams 202 when they are illuminated or do not provide the directional light beams 202 when they are not illuminated. Further, an intensity of the provided directional light beams 202 along with a direction of those directional light beams 202 defines the pixels of the color multiview image 16 being displayed by the multicolor static multiview display 200, while a color of the directional light beams 202 is determined by a selectable color of the multicolor static multiview display 200, according to various embodiments. The displayed views 14', 14", 14"' within the color multiview image 16 may be static or quasi-static, according to various embodiments.

The multicolor static multiview display 200 illustrated in FIG. 8 comprises an array of the multiview pixels 210. The multiview pixels 210 of the array are configured to provide a plurality of different views of the multicolor static multiview display 200. According to various embodiments, a multiview pixel 210 of the array comprises a plurality of diffraction gratings 212 configured to diffractively couple out or emit the plurality of directional light beams 202. The plurality of directional light beams 202 may have principal angular directions, which correspond to different views directions of different views in a set of views of the multicolor static multiview display 200. Moreover, grating characteristics of the diffraction gratings 212 may be varied or selected based on the radial direction of incident light beams to diffraction gratings 212, a distance to a light source that provides the incident light beams or both. In some embodiments, the diffraction gratings 212 and multiview pixels 210 may be substantially similar to diffraction gratings 130 and multiview pixel 140, respectively, of the multicolor static multiview display 100, described above.

As illustrated in FIG. 8, the multicolor static multiview display 200 further comprises a light guide 220 configured to guide light. In some embodiments, the light guide 220 may be substantially similar to the light guide 110 described above with respect to the multicolor static multiview display 100. According to various embodiments, the multiview pixels 210, or more particularly the diffraction gratings 212 of the various multiview pixels 210, are configured to scatter or couple out a portion of guided light (or equivalently 'guided light beams 204', as illustrated) from the light guide 220 as the plurality of directional light beams 202 (i.e., the guided light may be the incident light beams discussed above). In particular, the multiview pixels 210 are optically connected to the light guide 220 to scatter or couple out the portion of the guided light (i.e., guided light beams 204) by diffractive scattering or diffractive coupling.

In various embodiments, grating characteristics of the diffraction gratings 212 are varied based on or as a function of a radial direction of incident guided light beams 204 at the diffraction gratings 212, a distance between a light source that provides the guided light beams 204, or both. In this way, the directional light beams 202 from different diffraction gratings 212 in a multiview pixel may correspond to pixels of views of a color multiview image provided by the multicolor static multiview display 200.

The multicolor static multiview display 200 illustrated in FIG. 8 further comprises a multicolor light source 230. The multicolor light source 230 may be configured to provide the light to the light guide 110. In particular, the provided light (e.g., illustrated by arrows emanating from the multicolor light source 230 in FIG. 8) is guided by the light guide 110 as a plurality of guided light beams 204. The guided light beams 204 of the guided light beam plurality comprise a selectable color (i.e., the selectable color of the multicolor static multiview display 200) and have different radial directions from one another within the light guide 220, according to various embodiments. In some embodiments, the guided light beams 204 are provided with a non-zero propagation angle and, in some embodiments, having a collimation factor to provide a predetermined angular spread of the guided light beams 204 within the light guide 220, for example. According to some embodiments, the multicolor light source 230 may be substantially similar to one of the multicolor light source(s) 120 of the multicolor static multiview display 100, described above. For example, the multicolor light source 230 may be butt-coupled to an input edge of the light guide 220. The multicolor light source 230 may radiate light in a fan-shape or radial pattern to provide the plurality of guided light beams 204 having the different radial directions. Further, the multicolor light source 230 may comprise a plurality of different color optical emitters interlaced with one another within the multicolor light source. The selectable color may be a combination of different colors of light provided by the different color optical emitter plurality, for example.

Figure 9:
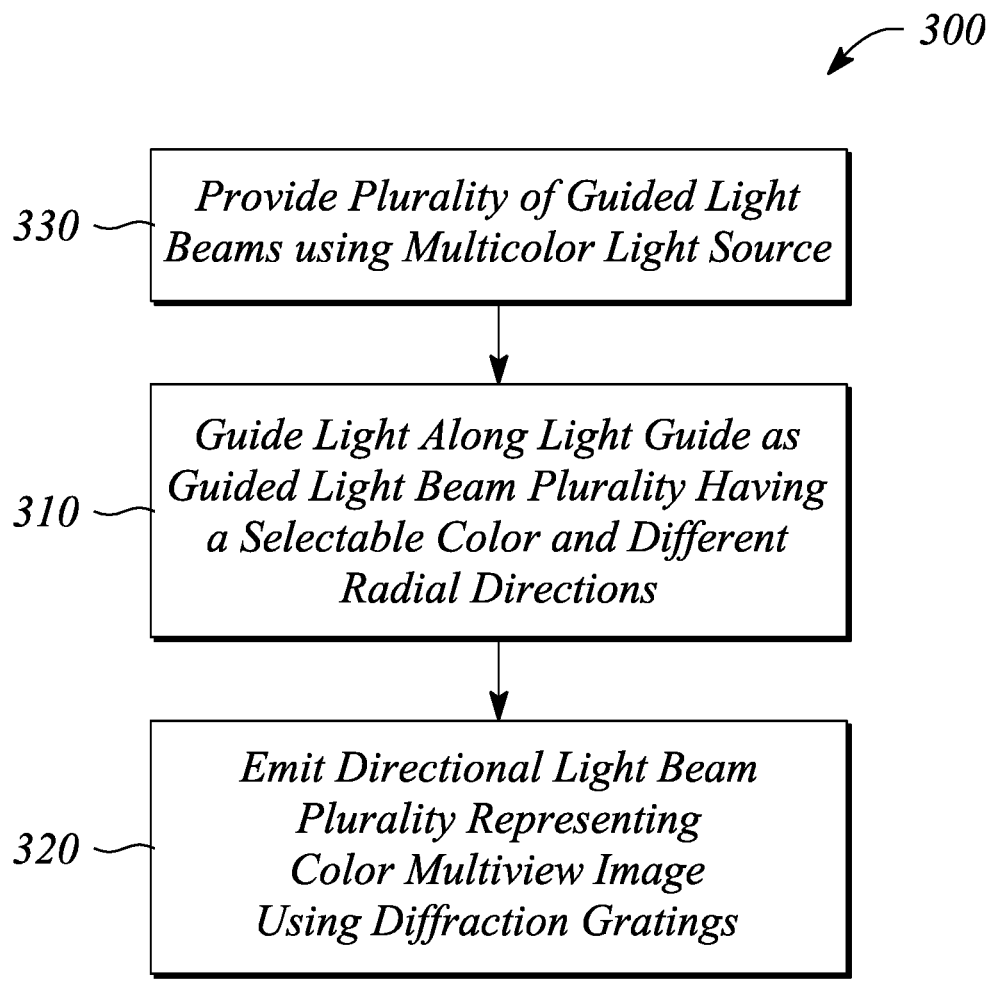
FIG. 9 illustrates a flow chart of a method of multicolor static multiview display operation in an example, according to an embodiment consistent with the principles described herein.

In accordance with other embodiments of the principles described herein, a method of multicolor static multiview display operation is provided. FIG. 9 illustrates a flow chart of a method 300 of multicolor static multiview display operation in an example, according to an embodiment consistent with the principles described herein. The method 300 of multicolor static multiview display operation may be used to provide one or both display of a color static multiview image and display of a color quasi-static multiview image, according to various embodiments.

As illustrated in FIG. 9, the method 300 of multicolor static multiview display operation comprises guiding 310 the light along the light guide as a plurality of guided light beams comprising a selectable color, the guided light beams of the guided light beam plurality having a common point of origin and different radial directions from one another. In particular, a guided light beam of the guided light beam plurality has, by definition, the selectable color. In addition, by definition, the guided light beam has a different radial direction of propagation from another guided light beam of the guided light beam plurality. Further, each of the guided light beams of the guided light beam plurality has, by definition, a common point of origin. The point of origin may be a virtual point of origin (e.g., a point beyond an actual point of origin of the guided light beam), in some embodiments. For example, the point of origin may be outside of the light guide and thus be a virtual point of origin. According to some embodiments, the light guide along which the light is guided 310 as well as the guided light beams comprising the selectable color that are guided therein may be substantially similar to the light guide 110 and guided light beams 112, respectively, as described above with reference to the multicolor static multiview display 100.

The method 300 of multicolor static multiview display operation illustrated in FIG. 9 further comprises emitting 320 a plurality of directional light beams representing a color multiview image using a plurality of diffraction gratings. According to various embodiments, a diffraction grating of the diffraction grating plurality diffractively couples or scatters out light from the guided light beam plurality as a directional light beam of the directional light beam plurality. Further, the directional light beam that is coupled or scattered out has both an intensity and a principal angular direction of a corresponding view pixel of the color multiview image. In particular, the plurality of directional light beams produced by the emitting 320 may have principal angular directions corresponding to different view pixels in a set of views of the color multiview image. Moreover, intensities of directional light beams of the directional light beam plurality may correspond to intensities of various view pixels of the color multiview image. In some embodiments, each of the diffraction gratings produces a single directional light beam in a single principal angular direction and having a single intensity corresponding to a particular view pixel in one view of the color multiview image. A color of the directional light beam is determined by the selectable color. In some embodiments, the diffraction grating comprises a plurality of diffraction grating (e.g., sub-gratings). Further, a set of diffraction gratings may be arranged as a multiview pixel of the multicolor static multiview display, in some embodiments.

In various embodiments, the intensity and principal angular direction of the emitted 320 directional light beams are controlled by a grating characteristic of the diffraction grating that is based on (i.e., is a function of) a location of the diffraction grating relative to the common origin point. In particular, grating characteristics of the plurality of diffraction gratings may be varied based on, or equivalently may be a function of, radial directions of incident guided light beams at the diffraction gratings, a distance from the diffraction gratings to a multicolor light source that provides the guided light beams, or both.

According to some embodiments, the plurality of diffraction gratings may be substantially similar to the plurality of diffraction gratings 130 of the multicolor static multiview display 100, described above. Further, in some embodiments, the emitted 320 plurality of directional light beams may be substantially similar to the plurality of directional light beams 102, also described above. For example, the grating characteristic controlling the principal angular direction may comprise one or both of a grating pitch and a grating orientation of the diffraction grating. Further, an intensity of the directional light beam provided by the diffraction grating and corresponding to an intensity of a corresponding view pixel may be determined by a diffractive coupling efficiency of the diffraction grating. That is, the grating characteristic controlling the intensity may comprise a grating depth of the diffraction grating, a size of the gratings, etc., in some examples.

As illustrated, the method 300 of multicolor static multiview display operation further comprises providing 330 light to be guided as the plurality of guided light beams using a multicolor light source. In particular, light is provided to the light guide as the guided light beams comprising the selectable color and having a plurality of different radial directions of propagation using the multicolor light source. According to various embodiments, the multicolor light source used in providing 330 light is located at a side of the light guide, the multicolor light source location being the common origin point of the guided light beam plurality. In some embodiments, the multicolor light source may be substantially similar to the multicolor light source(s) 120 of the multicolor static multiview display 100, described above.

In particular, the multicolor light source may be butt-coupled to an edge or side of the light guide. Further, the multicolor light source may approximate a point source representing the common point of origin, in some embodiments. In addition, in some embodiments, providing 330 light to be guided as the plurality of guided light beams using a multicolor light source comprising a plurality of different color optical emitters interlaced with one another within the multicolor light source.

In some embodiments (not illustrated), the method 300 of multicolor static multiview display operation further comprises combining colors of light provided 330 by the plurality of different color optical emitters to produce the selectable color. The colors of light may comprise red light, blue light and green light. The selectable color produced by combining colors may be substantially any color (e.g., according to an RGB color model).

In some embodiments (not illustrated), the method 300 of multicolor static multiview display operation further comprises animating the color multiview image by guiding a first plurality of light guided light beams during a first time period and guiding a second plurality of guided light beams during a second time period during a second period. The first guided light beam plurality may have a common origin point that differs from a common origin point of the second guided light beam plurality. For example, the light source may comprise a plurality of laterally offset light sources, e.g., configured to provide animation, as described above. Animation may comprise a shift in an apparent location of the color multiview image during the first and second time periods, according to some embodiments. In some embodiments, the selectable color may be changed between different predefined colors a part of or during animating.

Thus, there have been described examples and embodiments of a multicolor static multiview display and a method of multicolor static multiview display operation having diffraction gratings configured to provide a plurality of directional light beams representing a color static or quasi-static multiview image from guided light beams having different radial directions from one another. It should be understood that the above-described examples are merely illustrative of some of the many specific examples that represent the principles described herein. Clearly, those skilled in the art can readily devise numerous other arrangements without departing from the scope as defined by the following claims.

What is claimed is:

1. A multicolor static multiview display comprising:
   a plate light guide;
   a multicolor light source configured to provide a plurality of guided light beams comprising a selectable color and having different radial directions from one another within the plate light guide; and
   an array of multiview pixels configured to provide a plurality of different views of a color static multiview image, a multiview pixel comprising a plurality of diffraction gratings configured to diffractively couple out light from the guided light beam plurality to provide directional light beams representing color view pixels of the multiview pixel, at least two directional light beams having different intensities,
   wherein a principal angular direction of a directional light beam provided by a diffraction grating of the diffraction grating plurality is a function of one or both of a grating pitch of the diffraction grating and a grating orientation of the diffraction grating, the one or both of the grating pitch and the grating orientation being a function of a relative location of the diffraction grating and the light source, and wherein a color of the directional light beam is determined by the selectable color.

2. The multicolor static multiview display of claim 1, wherein the multicolor light source comprises a plurality of different color light emitting diodes interlaced with one another within the multicolor light source, the selectable color being a combination of different colors of light provided by the different color light emitting diode plurality.

3. The multicolor static multiview display of claim 1, wherein an intensity of the directional light beam provided by the diffraction grating and corresponding to an intensity of a corresponding view pixel is determined by a diffractive coupling efficiency of the diffraction grating.

4. The multicolor static multiview display of claim 1, wherein the light guide is transparent in a direction orthogonal to a direction of propagation of a guided light beam of the guided light beam plurality within the light guide.

5. A method of multicolor static multiview display operation, the method comprising:
   guiding in a light guide a plurality of guided light beams comprising a selectable color, guided light beams of the guided light beam plurality having a common point of origin and different radial directions from one another; and
   emitting a plurality of directional light beams representing a color static multiview image using a plurality of diffraction gratings, a diffraction grating of the diffraction grating plurality diffractively coupling out light from the guided light beam plurality as a directional light beam of the directional light beam plurality having an intensity and a principal angular direction of a corresponding view pixel of the color static multiview image,
   wherein the intensity of the emitted directional light beam is controlled by a grating depth of the diffraction grating, the grating depth being based on a location of the diffraction grating relative to the common origin point; and at least two directional light beams have different intensities, and
   wherein the principal angular direction of the emitted directional light beam is controlled by one or both of a grating pitch of the diffraction grating and a grating orientation of the diffraction grating; the one or both of the grating pitch and the grating orientation being based on the location of the diffraction grating relative to the common origin point,
   and wherein a color of the directional light beam is determined by the selectable color.

6. The method of multicolor static multiview display operation of claim 5, further comprising providing light to be guided as the plurality of guided light beams using a multicolor light source comprising a plurality of different color light emitting diodes interlaced with one another within the multicolor light source, the multicolor light source being located at a side of the light guide, wherein the multicolor light source location is the common origin point of the guided light beam plurality.

7. The method of multicolor static multiview display operation of claim 6, further comprising combining colors of light provided by the plurality of different color light emitting diodes to produce the selectable color, the colors of light comprising red light, blue light and green light.

8. The method of multicolor static multiview display operation of claim 5, further comprising animating the color static multiview image by guiding a first plurality of light guided light beams during a first time period and guiding a second plurality of guided light beams during a second time period, the first guided light beam plurality having a common origin point that differs from a common origin point of the second guided light beam plurality, wherein animation comprises a shift in an apparent location of the color static multiview image during the first and second time periods.

* * * * *

UNITED STATES PATENT AND TRADEMARK OFFICE
CERTIFICATE OF CORRECTION

| | | |
|---|---|---|
| PATENT NO. | : 11,906,761 B2 | Page 1 of 1 |
| APPLICATION NO. | : 18/129877 | |
| DATED | : February 20, 2024 | |
| INVENTOR(S) | : David A. Fattal | |

It is certified that error appears in the above-identified patent and that said Letters Patent is hereby corrected as shown below:

On the Title Page

In Column 1, under "Related U.S. Application Data", Line 1, delete "(60)" and insert --(62)-- therefor Signed and Sealed this
Twenty-ninth Day of April, 2025

Coke Morgan Stewart
*Acting Director of the United States Patent and Trademark Office*